US009830536B2

(12) United States Patent
Ganesh et al.

(10) Patent No.: US 9,830,536 B2
(45) Date of Patent: Nov. 28, 2017

(54) METHOD AND SYSTEMS FOR INCORPORATING ADVERTISEMENTS IN OBJECTS PRINTED ON THREE-DIMENSIONAL PRINTERS

(71) Applicant: QUALCOMM Incorporated, San Diego, CA (US)

(72) Inventors: Shriram Ganesh, San Diego, CA (US); Jose Roberto Menendez, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 633 days.

(21) Appl. No.: 14/455,431

(22) Filed: Aug. 8, 2014

(65) Prior Publication Data

US 2016/0042255 A1 Feb. 11, 2016

(51) Int. Cl.

| G06Q 30/00 | (2012.01) |
|---|---|
| G06K 15/02 | (2006.01) |
| G06Q 30/02 | (2012.01) |
| G06T 19/20 | (2011.01) |
| B29C 67/00 | (2017.01) |
| B33Y 80/00 | (2015.01) |

(52) U.S. Cl.
CPC .......... *G06K 15/02* (2013.01); *G06Q 30/0241* (2013.01); *G06T 19/20* (2013.01); *B29C 67/0051* (2013.01); *B33Y 80/00* (2014.12)

(58) Field of Classification Search
USPC ...................................................... 705/14.4
See application file for complete search history.

(56) References Cited

U.S. PATENT DOCUMENTS

| 8,812,532 | B2* | 8/2014 | Skaf ...................... G06Q 30/02 |
| | | | 705/14.53 |
| 2007/0198343 | A1* | 8/2007 | Collison ........... G06F 17/30864 |
| | | | 705/14.69 |
| 2011/0313878 | A1 | 12/2011 | Norman |
| 2012/0221433 | A1* | 8/2012 | Plattsmier .......... G06Q 30/0633 |
| | | | 705/26.8 |
| 2013/0328228 | A1 | 12/2013 | Pettis et al. |
| 2013/0329258 | A1* | 12/2013 | Pettis ................... F16M 13/022 |
| | | | 358/1.15 |
| 2014/0020192 | A1 | 1/2014 | Jones et al. |
| 2014/0074272 | A1 | 3/2014 | Cowden |
| 2014/0117585 | A1 | 5/2014 | Douglas et al. |

(Continued)

OTHER PUBLICATIONS

International Search Report and Written Opinion—PCT/US2015/040497—ISA/EPO—dated Oct. 2, 2015.

(Continued)

*Primary Examiner* — Daniel Sorkowitz
(74) *Attorney, Agent, or Firm* — The Marbury Law Group

(57) ABSTRACT

Systems, methods, and devices of the various embodiments enable advertisements (e.g., promotions, signs, logos, samples, etc.) to be part of the 3-D printing process. In an embodiment, advertisements (i.e., "ads"), such as partial product samples, may be 3-D printed prior to 3-D printing a purchased 3-D printable good. In another embodiment, ads may be 3-D printed on a 3-D printable good itself (e.g., embossed, impressed, as a tag, etc.). In a further embodiment, users may select the ads to be 3-D printed on their goods in return for compensation from advertisers.

30 Claims, 18 Drawing Sheets

(56) References Cited

U.S. PATENT DOCUMENTS

| | | | |
|---|---|---|---|
| 2014/0214371 A1 | 7/2014 | Schulz et al. | |
| 2014/0258275 A1* | 9/2014 | Paritosh | G06F 17/3097 |
| | | | 707/723 |
| 2014/0344091 A1* | 11/2014 | Krebs | B29C 67/0088 |
| | | | 705/26.1 |
| 2015/0120806 A1* | 4/2015 | Lippincott | H04L 67/10 |
| | | | 709/203 |

OTHER PUBLICATIONS

Morris G M, "How to Customize and Distribute Your First 3D Promotional Giveaway Item", Advertising & Marketing Review, Apr. 30, 2013, XP055215421,4 Pages. Retrieved from the Internet: URL:http://www.ad-mkt-review.com/public_html/docs/fs237.html; Sep. 22, 2015.

Carmy C., "The Next Leap in Social: 3D Printing," Mar. 28, 2013, Slide 1 to Slide 9.

Gardner A., "Lego Awarded 3D Printing Patent, May Allow Users to Print Own Bricks," 3D Print.com, Mar. 2, 2014, Slide 1 to Silde 10.

Morris G.E., "Advertising in the Third Dimension: An Advertiser's Guide to 3D Printing," [Retrieved date on May 19, 2014], Retrieved from the Internet < URL : http://www.thereviewcolorado.com/advertising-third-dimension-advertiser%E2%80%99s-guide-3d-printing >, Slide 1 to Slide 8.

* cited by examiner

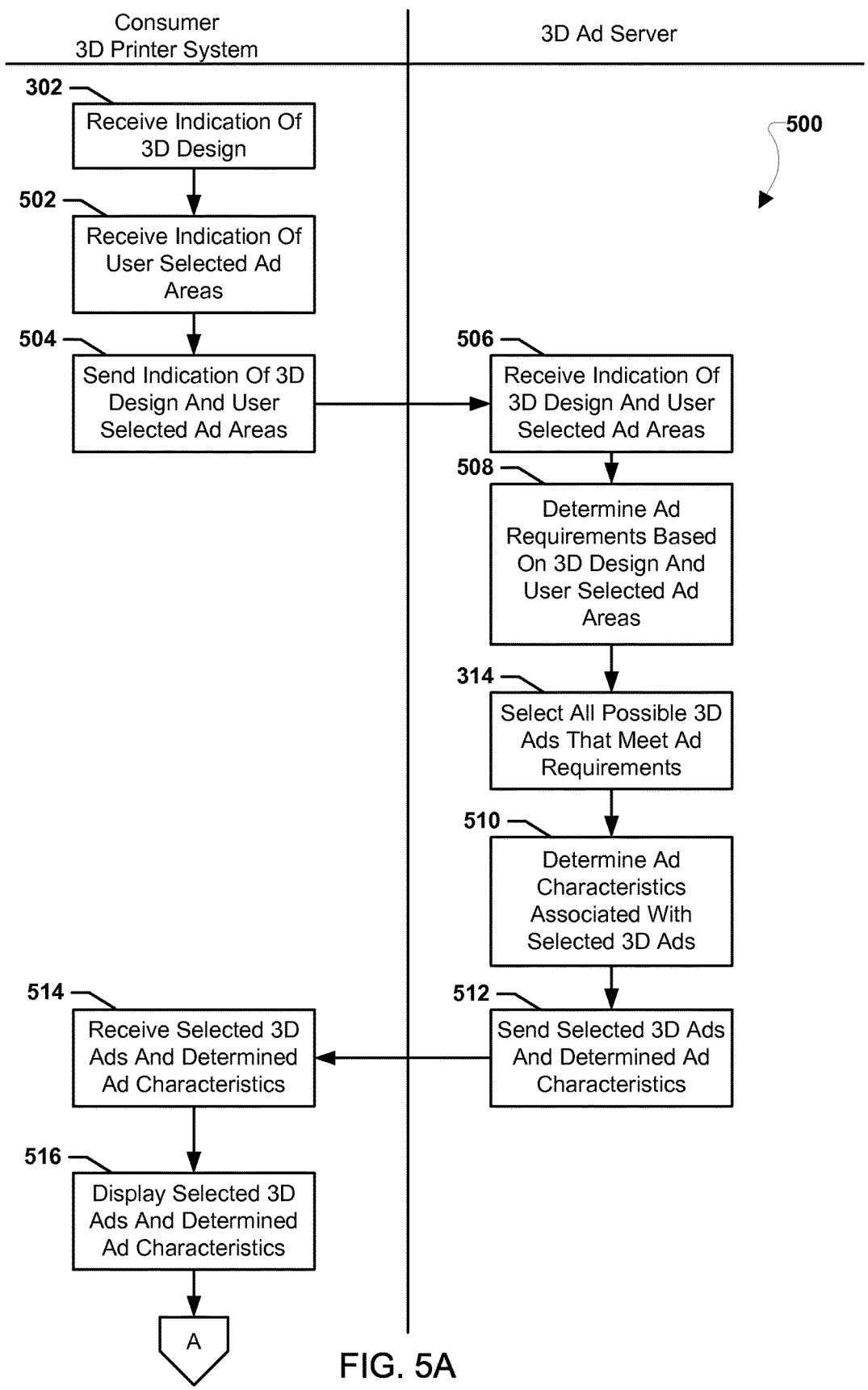

METHOD AND SYSTEMS FOR INCORPORATING ADVERTISEMENTS IN OBJECTS PRINTED ON THREE-DIMENSIONAL PRINTERS

BACKGROUND

Three-dimensional ("3-D") printing (i.e., additive manufacturing or stereolithography) is a growing consumer market, and 3-D printers are now available for purchase by consumers for home use. With the purchase of a 3-D printer, raw material (e.g., liquid, powder, paper, sheet metal, etc.), and 3-D printable data models (e.g., 3-D scans, templates, etc.), a consumer can make 3-D printable goods in his or her own home.

SUMMARY

The systems, methods, and devices of the various embodiments enable advertisements (e.g., promotions, signs, logos, samples, etc.) to be part of the 3-D printing process. In an embodiment, advertisements (i.e., "ads"), such as partial product samples, may be 3-D printed prior to 3-D printing a purchased 3-D printable good. In another embodiment, ads may be 3-D printed on a 3-D printable good itself (e.g., embossed, as a sticker, etc.). In a further embodiment, users may select the ads to be 3-D printed on their goods in return for compensation from advertisers.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 5A-5C are process flow diagrams illustrating an embodiment method for user selection of 3-D ads for 3-D printing.

DETAILED DESCRIPTION

Figure 1:
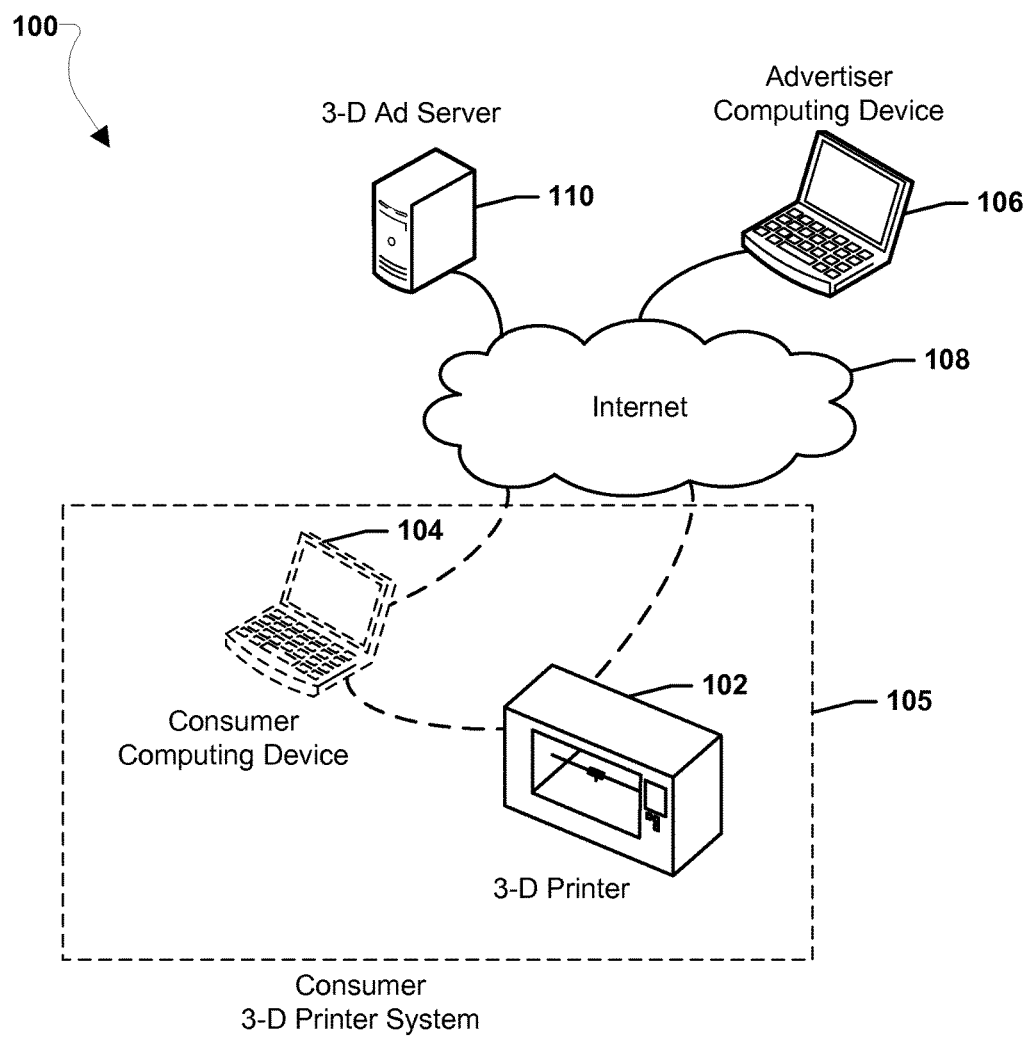
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "computing device" is used herein to refer to any one or all of cellular telephones, smart phones, personal or mobile multi-media players, personal data assistants (PDA's), desktop computers, laptop computers, tablet computers, smart books, palm-top computers, wireless electronic mail receivers, multimedia Internet enabled cellular telephones, wireless gaming controllers, and similar personal electronic devices which include one or more programmable processor, memory, and/or other circuitry for controlling the operation of a 3-D printer.

As used herein, the term "3-D printer" is used to refer to any device configured to use 3-D printing (i.e., additive manufacturing or stereolithography) processes to make 3-D printable goods from raw material (e.g., liquid, powder, paper, sheet metal, etc.) based at least in part on 3-D printable data models (e.g., 3-D scans, templates, etc.). 3-D printers may include programmable processor, memory, and/or other circuitry. In some configurations, 3-D printers may be peripheral devices. For example, in a peripheral device configuration, a 3-D printer may be connected to the Internet through a computing device and the 3-D printer may be controlled by a processor of the connected computing device. In other configurations, 3-D printers may be stand-alone devices. For example, in a standalone configuration, a 3-D printer may connect to the Internet without connecting to a computing device, and may operate entirely without inputs from another end user computing device.

The various embodiments are described herein using the term "server." The term "server" is used to refer to any computing device capable of functioning as a server, such as a master exchange server, web server, mail server, document server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device thereby enabling it to function as an Internet server (e.g., an enterprise e-mail server) only to the extent necessary to provide the functionality described herein.

The systems, methods, and devices of the various embodiments enable advertisements (e.g., promotions, signs, logos, samples, etc.) to be included as part of the 3-D printing process and included within the object produced by the printer. In an embodiment, advertisements (i.e., "ads"), such as partial product samples, may be 3-D printed prior to 3-D printing a purchased 3-D printable good. In another embodiment, ads may be 3-D printed on a 3-D printable good itself (e.g., embossed, as a sticker, etc.). In a further embodiment, users may select the ads to be 3-D printed on their goods in return for compensation from advertisers. The availability of such advertisements may allow vendors (e.g., Amazon®, Wal-Mart®, etc.) to sell 3-D printers, raw material, and/or 3-D printable models at a discount in return for producing advertisements (e.g., promotions, signs, logos, samples, etc.) on the generated objects. The ads and/or ad space (e.g. area on the product where ads may be inserted) may be included with the 3-D printers, raw material, and/or 3-D printable models. In some embodiments a consumer may be enabled to select an advertisement for inclusion on his or her selected 3-D printable good in return for compensation from the advertiser or discounts on 3-D models and/or raw materials.

In an embodiment, a remote 3-D ad server may interface with a consumer's 3-D printer system to manage advertisement functions. Examples of advertisement functions that may be managed by a remote 3-D ad server include selecting 3-D ads, controlling printing of the 3-D ads, providing 3-D ad layout and revenue information to users, validating 3-D ads, validating licensing, preventing advertisement spam, etc.

In an embodiment, a 3-D ad may be rendered as a sample or portion of a 3-D printable product or good, such as a cross section, frame, base, partial product, etc. In such embodiments the 3-D ad may be configured to provide the consumer with a look or feel of the ultimate 3-D printable product (e.g., a second 3-D printable product). In an embodiment, when the consumer purchases the product, this portion may be used as part of printing the rest of the ultimate 3-D printable product (e.g., as a base). In this manner, consumption of raw material may be reduced or minimized because already printed portions of the ultimate 3-D printable product may be reused.

In an embodiment, ads may be a permanent part of the purchased 3-D printable good, for example an impressed logo on the surface, by incorporating a specific, "signature" shape into the good (e.g., shaping a portion of the good to resemble the advertiser's design, such as a Coke® glass bottle shaped casing), etc. In an embodiment, ads may also be printed on a location and/or using structures that enable the ad to be removed from the purchased 3-D printable product, such as in embossed form or removable form like a tag. In an embodiment, the permanence or removablity of the ad and/or the age of the product it is printed on (e.g., cases for new model phones versus old model phones) may be taken into account by the 3-D ad server in determining the fee paid by the purchaser for the ad, such as the ad payment.

In an embodiment, consumers may use the 3-D ad server as a marketplace to purchase 3-D printable goods printed by a consumer's 3-D printer and to select advertisements that may be printed on the goods, such as in return for a reduced price for the printable goods. As an example, a "Find Me Ad" application may select from a database of potential advertisements those advertisements that may be printed on a particular 3-D printable object that the user has selected to purchase and produce on his/her 3-D printer. In an embodiment, the available advertisements, alternative sizes and shapes of those advertisements, the locations of the advertisements on products, the product to be advertized, the reputation of the advertiser, and the revenue for a potential advertisement may be displayed to the consumer (e.g., via a graphic user interface (GUI)) enabling the consumer to compare and select advertisements. Additionally, the 3-D ad server may prevent spam or other undesirable advertisements by tracking advertiser reputation, preventing unlicensed advertisements, and/or confirming advertisement selection and/or placement. In an embodiment, the 3-D ad server may also ensure that advertisements are printed before the purchased 3-D printable good is completed to prevent consumers from terminating printing prior to ad completion.

The 3-D ad server may use information regarding the user's preferences, the user's printing history, capabilities of the user's 3-D printer, and current raw material types and supply levels of the user's 3-D printer. This information may be provided to the 3-D ad server in a variety of ways. In a first example, the information may be provided as metadata in an access request sent to the 3-D ad server by the user's computing device or 3-D printer. In a second example, the information may be provided in data fields of an electronic form submitted to the 3-D ad server by the user's computing device or 3-D printer as part of requesting access to the 3-D server catalog. In a third example, the 3-D ad server may maintain a database of user preferences and 3-D printer capability(ies). In the third example, users may register with the 3-D ad server during which they provide their user preferences, and 3-D printer characteristics, and the 3-D ad server may maintain a user account in which the server records the user printing history and tracks supply levels of the user's 3-D printer.

In an embodiment, user preferences that may be stored in a user account data record of the 3-D ad server or provided as data or metadata by the user's computing device or 3-D printer may include settings selected by a user to guide the selection of 3-D ads and to restrict how 3-D ads may be applied. An example user preference may be a user restriction indicating that the user is required to provide approval prior to commencing any 3-D printing. This user restriction of requiring approval may eliminate unwanted spam printing and ensure a user is aware of the impact that printing a 3-D ad may have on an object. Another example user preference may be a user preference to maximize the subsidy he or she receives by selecting the combination of 3-D ads with the highest ad payment amount. A further example user preference may be a preference to minimize the impact of 3-D printing on a 3-D design, such as by preventing holes to be formed in an object. In this manner, the integrity of the 3-D design for its intended purpose, such as a cup to hold liquids vs. a cup to hold pens, may be maintained. Another example user preference may be a preference for the placement of 3-D ads, such as center, top, bottom, etc. A further example user preference may be a user restriction on 3-D ad size, such as a maximum area measurement (e.g., inches squared), percentage exterior surface area coverage maximum, percentage interior surface area coverage maximum, percentage total surface area coverage maximum, etc. An additional example user preference may be a user restriction on the number of advertisements to put on a 3-D design, such as one, two, three, etc. A further example user preference may be a brand preference indication, such as brand level indication (e.g., luxury, technology, consumer, etc.) or specific authorized brand names (e.g., Coke®, Pepsi ®, etc.).

In an embodiment, a user history that may be stored in a user account data record of the 3-D ad server or provided as data or metadata by the user's computing device or 3-D printer may include previous approved 3-D printed products and 3-D ads. The user history metadata may enable the 3-D ad server to learn and predict user preferences, and to select 3-D ads that are related to previous prints the user has made. For example, a user history may indicate a certain cup was previously printed by the user with a particular ad, and a when printing a bowl in the same cookware set the same ad may be recommended or selected because the bowl is related to the cup.

In an embodiment, 3-D printer capabilities that may be stored in a user account data record of the 3-D ad server or provided as data or metadata by the user's computing device or 3-D printer may include aspects or characteristics of the user's 3-D printer defining the products and ads that may be printed. As examples, 3-D printer capabilities may include the maximum and/or minimum printable dimensions, maximum and/or minimum printing accuracy and precision, printing supply capabilities, such as raw material types supported, colors supported, etc., ability to mix raw materials, print rate, etc. The 3-D printer capabilities may operate as user ad restrictions enabling the 3-D ad server to prevent 3-D ads not physically suited to a user's 3-D printer from being selected for a user. For example, a luxury car brand may have stringent requirements for accuracy and precision, minimum size, color, etc. for the luxury car brand's ads that the end-user's 3-D printer cannot produce, and in response to determining the end-user's 3-D printer cannot meet the stringent requirements those ads may be excluded from the set of possible ads available to that end-user's 3-D printer.

In an embodiment, 3-D printing supply levels that may be stored in a user account data record of the 3-D ad server or provided as data or metadata by the user's computing device or 3-D printer may include the current status of the raw material available for use by a user's 3-D printer. As examples, 3-D printing supply levels may include amounts and types of raw materials, colors of raw materials, and costs (e.g., cost per gram) of raw materials. The 3-D printing supply levels may operate as user ad restrictions enabling the 3-D ad server to prevent 3-D ads for which a user does not have the appropriate supplies from being selected for a user. For example, a user without the appropriate amount of red color material may be prevented from selecting a Coke® ad because the ad would not be completed in the required red color based on the 3-D printing supply level.

In an embodiment, a user may select a 3-D design and the user's computing device or 3-D printer system may indicate the design to a 3-D ad server. As an example, a user may select a design by purchasing the 3-D design from a vendor website. As another example, a user may select a design by loading a 3-D design raw material kit into his or her 3-D printer. As a further example, the user may select a design by indicating a product he or she already possesses (such as a cell phone case, cup, bottle, bike helmet, etc.) on which he or she desires to print a 3-D ad and affix it to the product (e.g., the 3-D ad may be 3-D printed directly onto the product or the 3-D ad may be 3-D printed for affixing manually upon completion). As another example, a user may select a design by providing an existing 3-D model the user already has possession of, such as a previously purchased 3-D model, a 3-D model the user crafted themselves, a 3-D model received from another user, etc., to the 3-D ad server (e.g., by loading the 3-D model from a memory of the user's computing device, by loading the 3-D model from a cloud storage location, by indicating to the 3-D ad server a previously up-loaded 3-D model, etc.)

In an embodiment, the 3-D ad server may determine ad requirements based on an indicated 3-D design. An ad requirement may be one or more attributes of 3-D ads that may be printed on or with the 3-D design. As examples, ad requirements may indicate ad area dimensions, such as a maximum printable surface area of a 3-D design, a number of attachment points for raised 3-D ads, a texture of a surface of the 3-D design, etc. Ad requirements may serve to separate ads that may be incorporated in a 3-D design from those that may not be incorporated in the 3-D design.

In an embodiment, the 3-D ad server may generate renderings of the 3-D design showing all of the 3-D ads that meet ad requirements and user ad restrictions for a user. In this manner, separate renderings for each possible 3-D ad as it would appear on a 3-D design may be presented to a user. In an additional embodiment, the 3-D ad server may also determine ad characteristics for each generated rendering. Ad characteristics may be indications of information about the 3-D ad. Examples of ad characteristics include ad payment amounts and advertiser credibility rating associated with a 3-D ad. Ad payment amounts may be the amount a user will be paid in some format (e.g. credited to the user's 3-D market account for use to purchase more 3-D designs, credit transferred to a bank account associated with the user from an advertiser account, discount on the product being 3-D printed, etc.) by an advertiser for printing the advertiser's 3-D ad on a product. Ad payment amounts may depend on multiple factors, including the size of the 3-D ad, the placement of the 3-D ad, the age of the product the ad will be printed on, the popularity of the product the ad will be printed on, the advertiser, the popularity of the 3-D ad, etc. Advertiser credibility ratings may be relative rankings of the advertiser, and may be indicative of the speed at which advertisers pay for advertisements, the likelihood the advertiser will spam the user by printing unwanted 3-D ads, etc.

In an embodiment, the generated renderings and the determined ad characteristics may be sent to, and displayed for, the user to enable the user to select a generated rendering. In an embodiment, the 3-D ad server may generate a 3-D printable data model for the 3-D design including the selected 3-D and send the 3-D printable data model to the 3-D printer queue to be printed.

In an alternative embodiment, the 3-D ad server may select a single 3-D ad for the user that meets the ad requirements and user ad restrictions. In an embodiment in which user authorization is not required for printing, the 3-D ad server may generate a 3-D printable data model for the 3-D design including the selected 3-D ad and send the 3-D printable data model to the 3-D printer queue to be printed. In an embodiment in which user authorization is required for printing, the 3-D ad server may generate a rendering of the 3-D design and selected 3-D ad, and send the rendering and any determined ad characteristics to the user's computing device for display to enable the user to approve the generated rendering. When the design and ad are approved by the user, a 3-D printable data model for rendering the design and ad may be generated and sent to the 3-D printer queue to be printed. When the user disapproves the design and ad, the user may modify the 3-D parameters via the user's computing device and the user-changed 3-D ad parameters may be used by the 3-D ad server to select a new 3-D ad that meets the ad requirements and user ad restrictions.

In an embodiment, 3-D printable data models may be configured to print the 3-D ads before completing the printing of the 3-D designs. In this manner, advertisers may be assured that their ads are printed prior to releasing ad payment amounts to users' accounts. In an embodiment, a user's 3-D printer may indicate the completion of printing a 3-D ad. In an embodiment, a user's 3-D printer screen may additional display ads for other products while a 3-D product or 3-D ad are being printed.

In an embodiment, a user may select multiple 3-D ads for printing on his or her 3-D design or object, and the 3-D ad server may track completion of each 3-D ad printing and payment to the user of the ad payment amount as each 3-D ad is completed.

In an embodiment, vendors (e.g., Amazon® or Wal-Mart®) may bundle ads with the raw material kits purchased by a consumer for their 3-D printers. The raw material kits sold to customers for printing a purchased 3-D printable good (e.g., a bike helmet), may include additional material that may be used for printing a 3-D ads, such as a portion or sample of a second product. Vendors may sell the ability to use the additional material as a 3-D ad to advertisers to help offset a portion or entirety of the cost of the raw material kit and/or increase revenue for the vendors. In an embodiment, the 3-D ads associated with the kit may be predetermined by the 3-D ad server prior to sale or shipment of the raw material based on the purchased 3-D printable good (e.g., a cross-section of a bike tire illustrating its unique safety features with a purchased bike helmet raw material and design). In another embodiment, the 3-D ads may be determined at the time of printing and sent to the 3-D printer from the 3-D ad server. In this manner, vendors may double their retail shelf space by effectively stocking two revenue generating items (i.e., the purchased 3-D printable good's raw material and the second advertisement product using the bundle additional material) in the single location of the raw material kit. In an embodiment, the 3-D ads may be auctioned to advertisers by the 3-D ad server.

The various embodiments may provide methods for managing advertisement functions on a consumer's 3-D printer system (e.g., the consumer's computing device and/or 3-D printer) via a remote 3-D ad server, including management of functions for selecting 3-D ads, controlling printing of the 3-D ads, providing 3-D ad layout and revenue information to users, validating 3-D ads, validating licensing, preventing advertisement spam, etc. In this manner, the various embodiments may improve the functioning of a consumer's 3-D printer system by enabling 3-D printers to reduce or minimize the amount of raw material used in printing 3-D advertisements, for example by preventing unwanted 3-D advertisements from being printed, by reusing existing 3-D printable goods or portions of 3-D printable goods, etc.

FIG. 1 illustrates a system 100 suitable for use with the various embodiments. The system 100 may include a 3-D printer 102, an optional consumer computing device 104, one or more advertiser computing device 106, and a 3-D ad server 110 all connected via a network, such as the Internet 108. Through their respective connections to the Internet 108, the 3-D printer 102, the optional consumer computing device 104, the one or more advertiser computing device 106, and the 3-D ad server 110 may exchange information with one another. In an embodiment, the 3-D printer 102 may connect directly to the Internet 108 and the consumer computing device 104 may be optional. In another embodiment, the 3-D printer 102 may connect to the consumer computing device 104 and through the connection to the consumer computing device 104 connect to the Internet 108. Whether the optional consumer computing device 104 is connected to the 3-D printer 102 or not, the 3-D printer 102 and any connected device may be considered collectively a consumer 3-D printer system 105. In an embodiment, the 3-D ad server 110 may host 3-D ads provided by the one or more advertiser computing device 106 and generate 3-D printable data models for output to the consumer 3-D printer system 105 and printing by the 3-D printer 102. In an embodiment, in addition to, or in place of, hosting 3-D ads provided by the one or more advertiser computing device 106, the 3-D ad server 110 may be a server of a 3-D printable data model seller and may incorporate the sellers own ads directly into the 3-D printable data models and/or provide ads to for display on the devices of the consumer 3-D printer system 105, such as a display of the consumer computing device 104 and/or 3-D printer 102.

Figure 2:
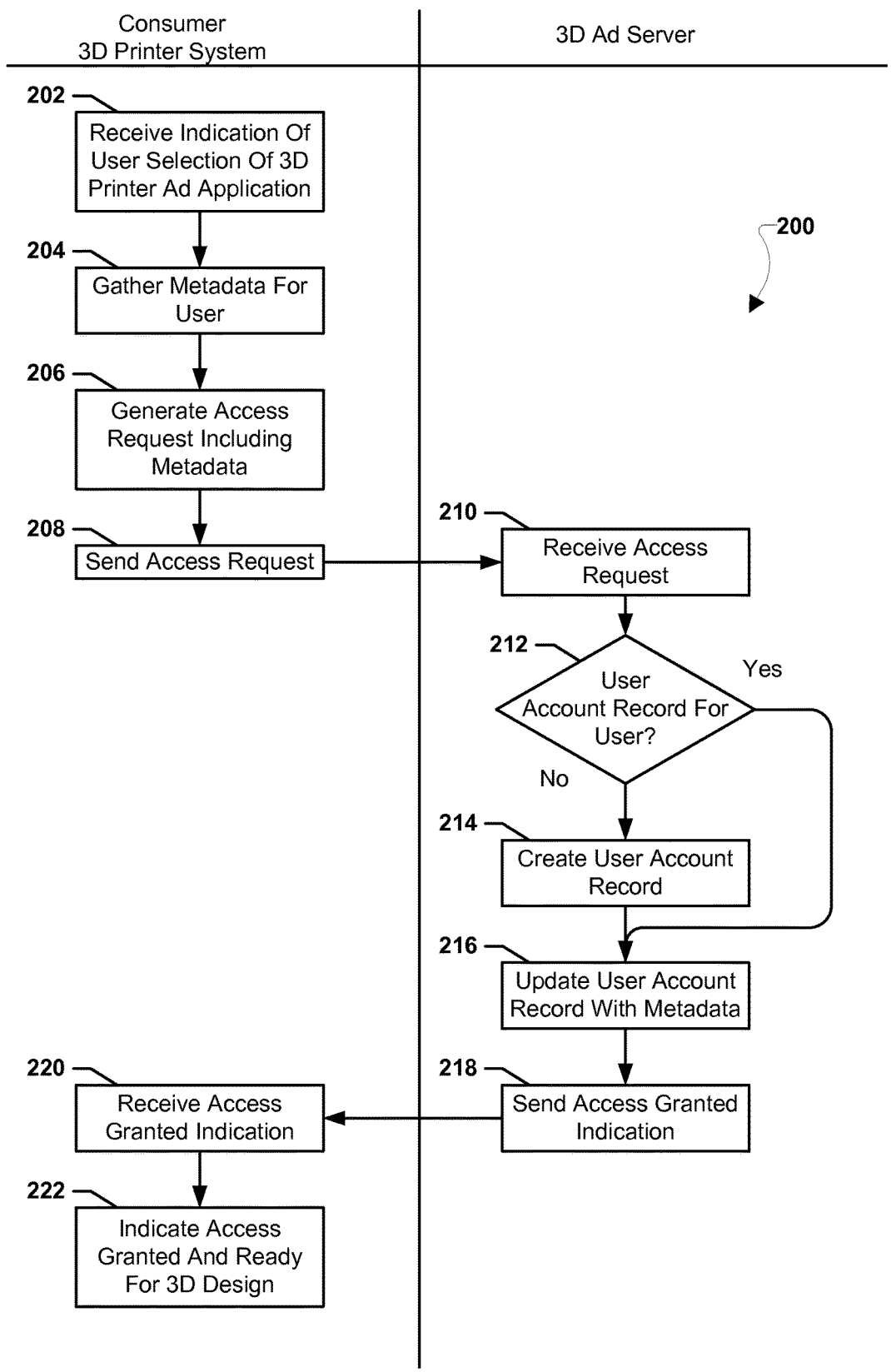
FIG. 2 is a process flow diagram illustrating an embodiment method for granting access to a 3-D ad server.

FIG. 2 illustrates an embodiment method 200 for granting access to a 3-D ad server. In an embodiment, the operations of method 200 may be performed by a processor of a consumer 3-D printer system, such as a processor of a mobile computing device or a processor of a 3-D printer, in communication with a 3-D ad server. In block 202 the consumer 3-D printer system processor may receive an indication of a user selection of a 3-D printer ad application. For example, the processor may receive an indication of a button press event indicating a user selected a button to start a 3-D printer ad application.

In block 204 the consumer 3-D printer system processor may gather data regarding user preferences, printing history, and printer characteristics for relaying to the 3-D ad server, particularly in embodiments in which the 3-D ad server does not maintain a user account database. In an embodiment, such data may be gathered passively, such as by polling application settings or past print job information stored in a memory available to the processor or by polling sensors on the 3-D printer to determine 3-D printer capabilities and 3-D printing supply levels. In an embodiment, data for supporting the access to the 3-D ad server may be gathered actively, such as by presenting a pop-up window on the user's computing device requesting the user to input or select user preferences associated with 3-D printing. Example user preferences may include a user restriction indicating that the user is required to provide approval prior to commencing any 3-D printing, a user preference to maximize the subsidy he or she receives by selecting 3-D ads with the highest ad payment amount, a preference to minimize the impact of 3-D printing on a 3-D design, a preference for the placement of 3-D ads, a user restriction on 3-D ad size, a user restriction on the number of advertisements to put on a 3-D design, a brand preference indication, etc. In block 206 the consumer 3-D printer system processor may generate an access request including the user and printer data, such as by including such data as either data fields in an access request electronic form or as metadata in an access URL. The access request may identify the user requesting access to the 3-D ad server. In block 208 the consumer 3-D printer system processor may send the access request to the 3-D ad server.

In block 210 the 3-D ad server may receive the access request, and in determination block 212 the 3-D ad server may determine whether a user account record for the user exists. In response to determining that a user account record does not exist (i.e., determination block 212="No"), in block 214 the 3-D ad server may create a user account record using the data received in the access request. In response to determining that a user account record does exist (i.e., determination block 212="Yes"), or upon creating a new user account record in block 214, the 3-D ad server may update the user account record with the metadata in block 216. In block 218 the 3-D ad server may send an access granted indication to the consumer 3-D printer system processor, and in block 220 the consumer 3-D printer system processor may receive the access granted indication. In block 222 the consumer 3-D printer system processor may indicate that access was granted and that the consumer 3-D printer system processor is ready to receive a 3-D design.

Figure 3A:
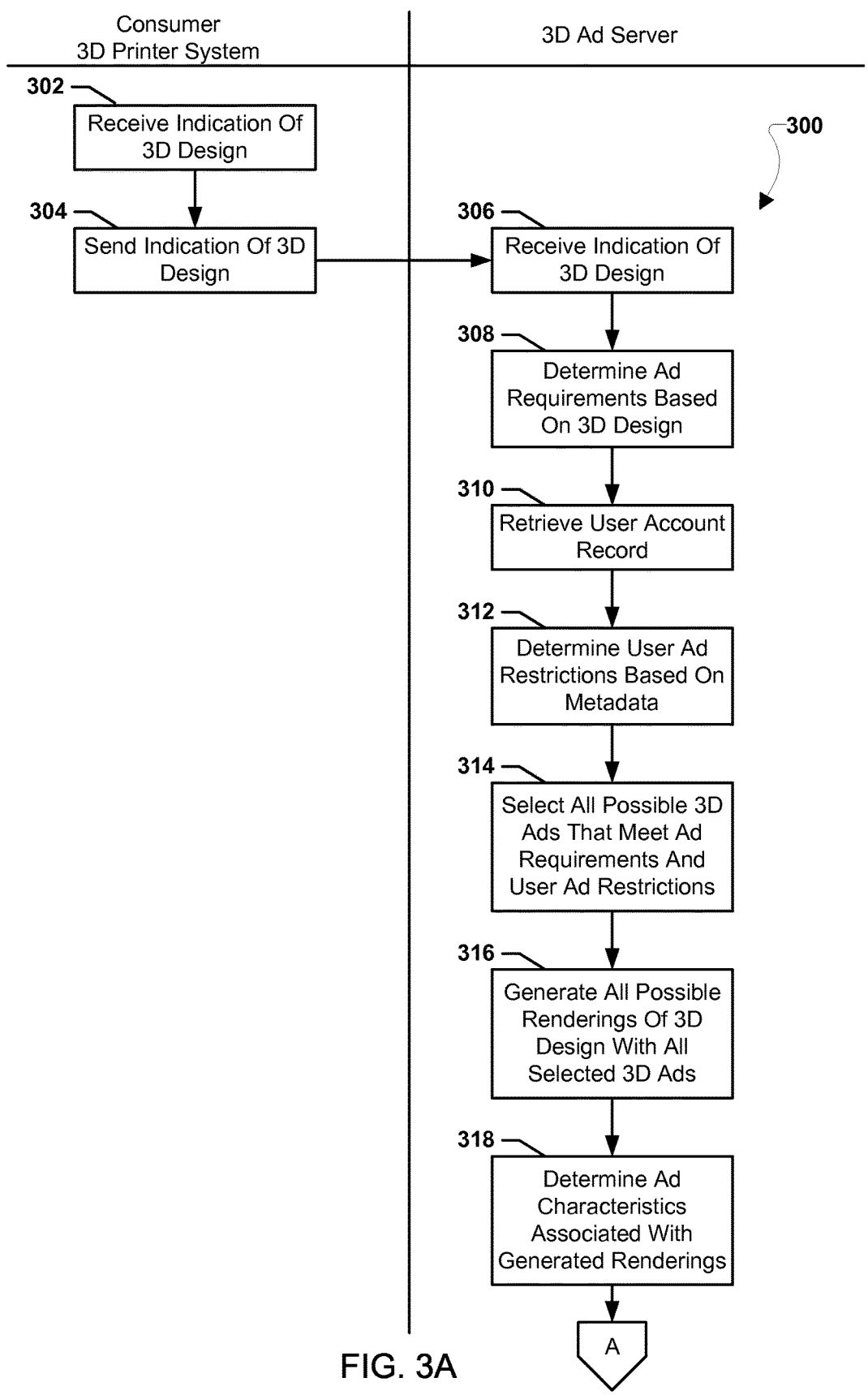
FIGS. 3A-3C are process flow diagrams illustrating an embodiment method for generating a 3-D printable data mode for a 3-D design including a 3-D ad.
Figure 3B:
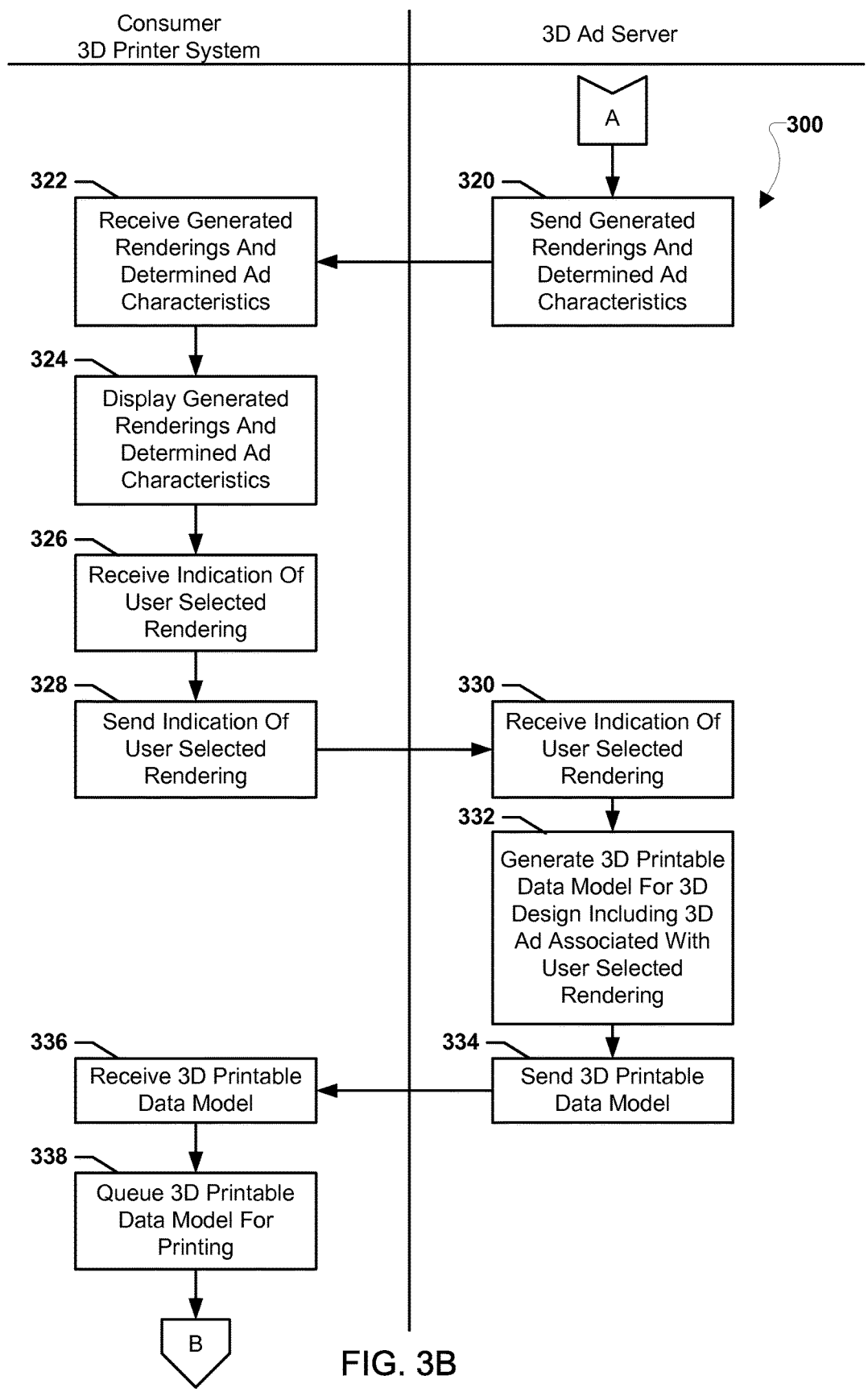
Figure 3C:
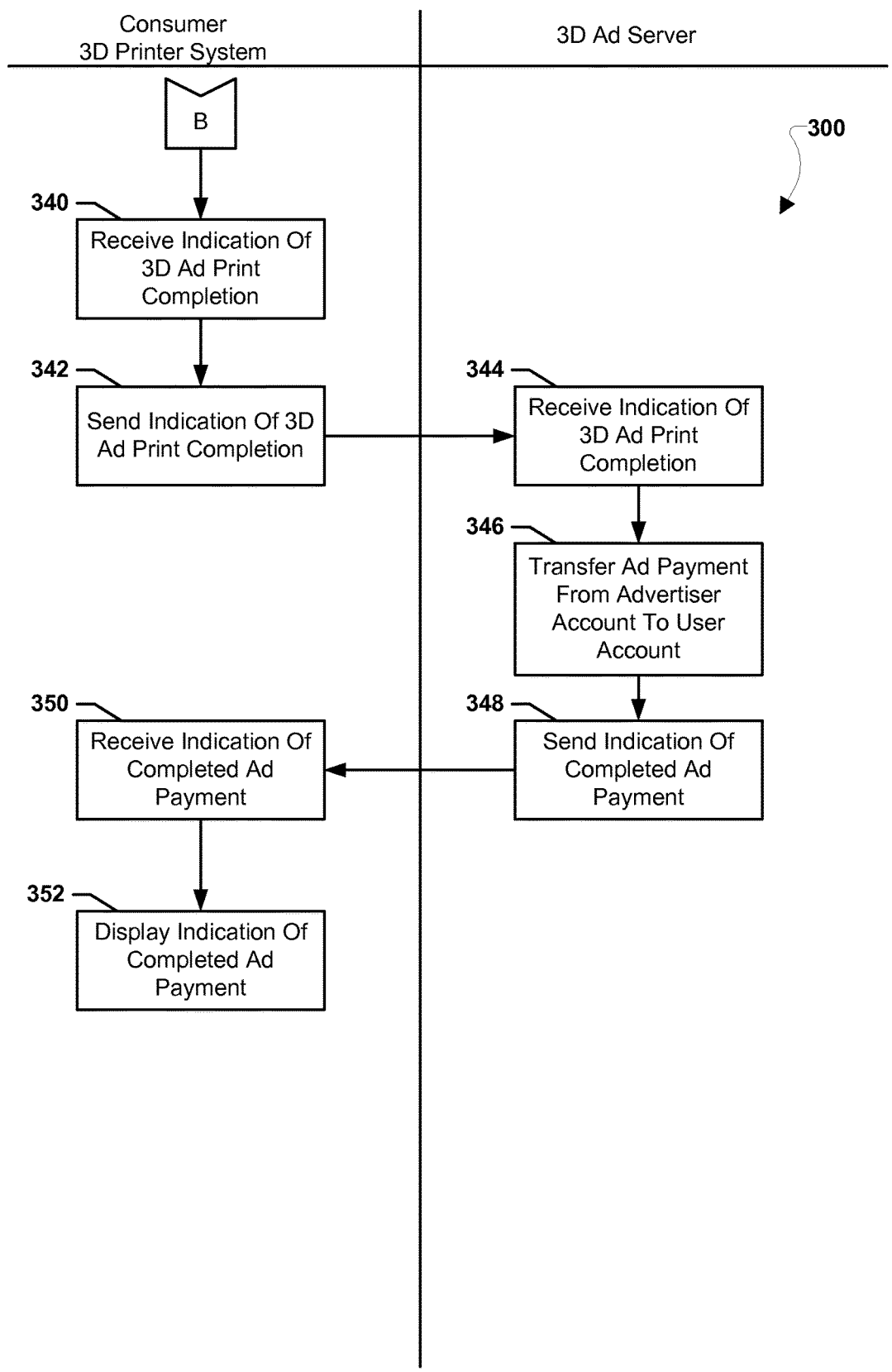

FIGS. 3A-3C illustrate an embodiment method 300 for generating a 3-D printable data mode for a 3-D design including a 3-D ad. In an embodiment, the operations of method 300 may be performed by a processor of a consumer 3-D printer system, such as a processor of a mobile computing device or a processor of a 3-D printer, in communication with a 3-D ad server. In an embodiment, the operations of method 300 may be performed in conjunction with method 200 described above with reference to FIG. 2.

In block 302 (FIG. 3A) the consumer 3-D printer system processor may receive an indication of a 3-D design. 3-D designs may be indicated to the consumer 3-D printer system processor in response to various events, such as a user selecting a design by purchasing the 3-D design from a vendor website, a user selecting a design by loading a 3-D design raw material kit into his or her 3-D printer, a user selecting a design by indicating a product he or she already possess (such as a cell phone case, cup, bottle, bike helmet, etc.) on which he or she desires to print a 3-D ad, a user selecting a design by providing an existing 3-D model the user already has possession of (such as a previously purchased 3-D model, a 3-D model the user crafted themselves, a 3-D model received from another user, etc.), into which he or she desires to incorporate a 3-D ad. In block 304 the consumer 3-D printer system processor may send an indication of the 3-D design to the 3-D ad server, and in block 306 the 3-D ad server may receive the indication of the 3-D design.

In block 308 the 3-D ad server may determine ad requirements based on the 3-D design. Ad requirements may be attributes of 3-D ads that may be printed on or with the 3-D design. As examples, ad requirements may indicate ad area dimensions, such as a maximum printable surface area of a 3-D design, a number of attachment points for raised 3-D ads, a texture of a surface of the 3-D design, etc. Additionally, ad requirements may include a requirement that the ads to be printed by properly licensed to an advertiser. Ad requirements may be stored in a memory available to the 3-D ad server and correlated with 3-D design indications. The 3-D ad server may determine 3-D ad requirements by matching the received 3-D design indication to a 3-D design indication in memory. In block 310 the 3-D ad server may retrieve the user's account record. As discussed above, the account record may include metadata associated with the user. In block 312 the 3-D ad server may determine user ad restrictions based on the metadata.

In block 314 the 3-D ad server may select all possible 3-D ads that meet the determined ad requirements and determined user ad restrictions. In block 316 the 3-D ad server may generate multiple renderings of the 3-D design with all the selected 3-D ads. In this manner, all possible permutations of the 3-D design including the selected 3-D ads may be considered. In block 318 the 3-D ad server may determine ad characteristics associated with the generated renderings. Ad characteristics may be indications of information about the 3-D ad. Examples of ad characteristics include ad payment amounts and advertiser credibility rating associated with a 3-D ad. Ad payment amounts may be the amount a user will be paid by an advertiser for printing the advertiser's 3-D ad on a product. Ad payment amounts may vary on multiple factors, including the size of the 3-D ad, the placement of the 3-D ad, the age of the product the ad will be printed on, the popularity of the product, the advertiser, the popularity of the 3-D ad, etc. Advertiser credibility ratings may be relative rankings of the advertiser, and may be indicative of the speed at which advertisers pay for advertisements, the likelihood the advertiser will spam the user by printing unwanted 3-D ads, etc.

Referring to FIG. 3B, in block 320 the 3-D ad server may send the generated renderings and determined ad characteristics to the consumer 3-D printer system processor, and the consumer 3-D printer system processor may receive the generated renderings and determined ad characteristics in block 322. In block 324 the consumer 3-D printer system processor may display the generated rendering and determined ad characteristics. For example, the consumer 3-D printer system processor may display the renderings and ad characteristics in a graphical user interface (GUI) enabling the user to select a desired rendering for printing. In block 326 the consumer 3-D printer system processor may receive an indication of a user selected rendering. In block 328 the consumer 3-D printer system processor may send the indication of the user selected rendering to the 3-D ad server, and in block 330 the 3-D ad server may receive the indication of the user selected rendering.

In block 332 the 3-D ad server may generate a 3-D printable data model for the 3-D design including the 3-D ad associated with the user selected rendering. In an embodiment, the 3-D printable data model may be a file enabling a 3-D printer to print the 3-D design and the 3-D ad. In an embodiment, the 3-D printable data model may be configured such that the 3-D ad prints prior to completion of the 3-D design printing. In block 334 the 3-D ad server may send the 3-D printable data model to the consumer 3-D printer system processor, and in block 336 the consumer 3-D printer system processor may receive the 3-D printable data model. In block 338 the consumer 3-D printer system processor may queue the 3-D printable data model for printing. For example, the 3-D printable model may be loaded into a 3-D print queue.

Referring to FIG. 3C, in block 340 the consumer 3-D printer system processor may receive an indication of 3-D ad print completion, such as in the form of a flag or signal that the printing process has completed. In block 342 the consumer 3-D printer system processor may send an indication of 3-D ad print completion to the 3-D ad server, and in block 344 the 3-D ad server may receive the indication of the 3-D ad print completion. In block 346 the 3-D ad server may transfer the ad payment from the advertiser's account to the user's account when the user is compensated for printing the ad, or to the entity that owns the digital rights to the design when the user is given a discount on the design in exchange for printing the ad. In this manner, advertisers may only be required to pay for ads that are actually rendered on the printed 3-D object. In instances in which the user is compensated for printing the 3-D ad, block 348 the 3-D ad server may send an indication of a completed ad payment to the consumer 3-D printer system processor and in block 350 the consumer 3-D printer system processor may receive the indication of the completed ad payment. In block 352 the consumer 3-D printer system processor may display an indication of the completed ad payment. In instances in which the user is provided a discount for printing the 3-D ad, an indication of completed ad payment may be sent to the owner of the digital rights of the printed object in block 348.

FIGS. 4A-4D illustrate another embodiment method 400 for generating a 3-D printable data mode for a 3-D design including a 3-D ad. In an embodiment, the operations of method 400 may be performed by a processor of a consumer 3-D printer system, such as a processor of a mobile computing device or a processor of a 3-D printer, in communication with a 3-D ad server. In an embodiment, the operations of method 400 may be performed in conjunction with method 200 described above with reference to FIG. 2.

In blocks 302-312 (FIG. 4A) the consumer 3-D printer system processor and 3-D ad server may perform operations of like numbered blocks of method 300 described above. In block 402 the 3-D ad server may select a 3-D ad that meets the ad requirements, user ad restrictions, and printer capabilities and supplies. In this manner, the 3-D ad server may act as an ad selection engine to automatically select an ad for the user. In determination block 404 the 3-D ad server may determine whether user approval of the ad is required. For example, the 3-D ad server may determine whether user preferences indicate that user approval is required or whether automatic printing is authorized in the user preferences data. In response to determining that user approval is not required (i.e., determination block 404="No"), in block 405 the 3-D ad server may generate a 3-D printable data model for the 3-D design including the selected 3-D ad. In blocks 334-352 (FIG. 4D), the 3-D ad server and the consumer 3-D printer system processor may perform operations of like numbered blocks of method 300 described above.

Figure 4A:
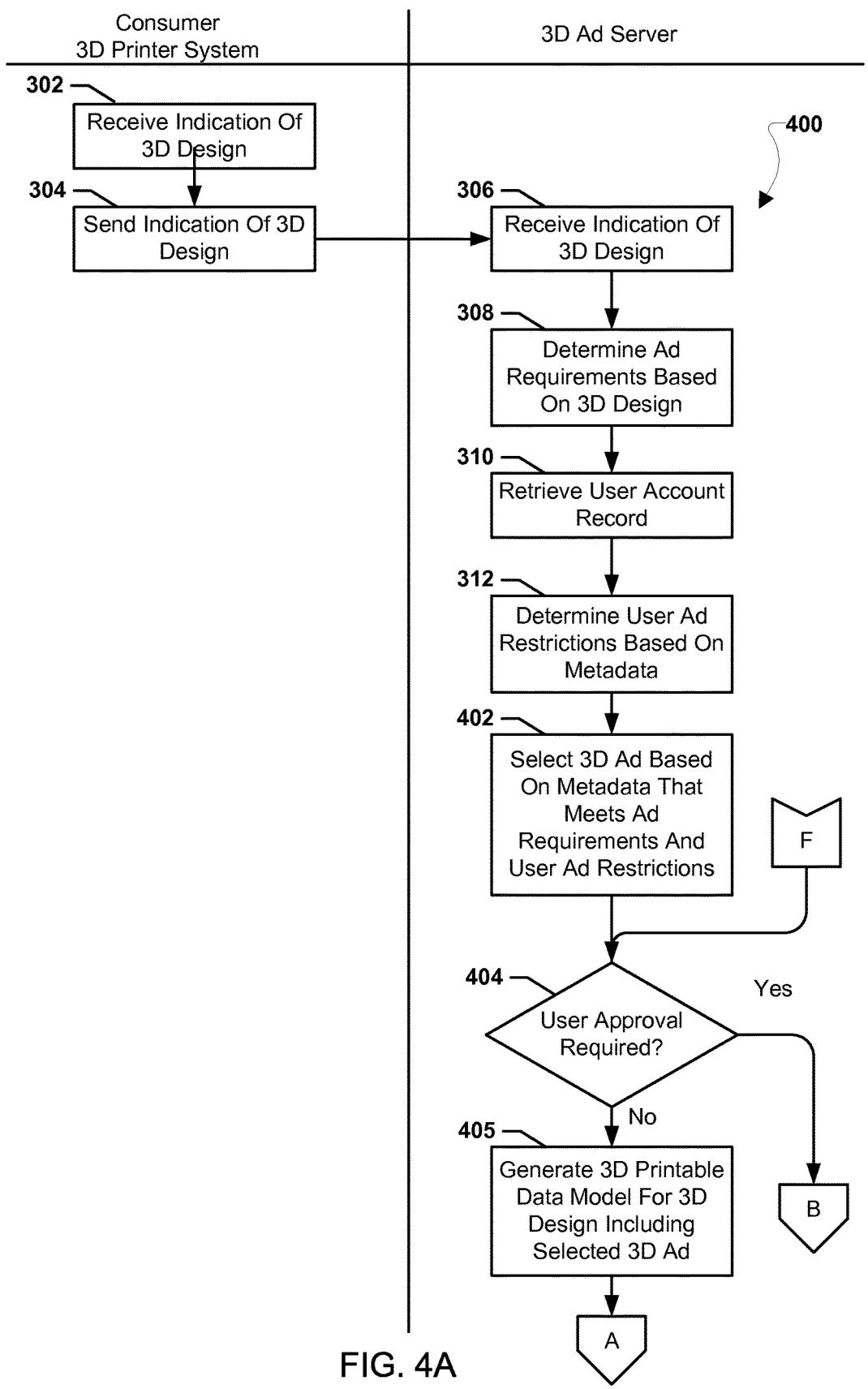
FIGS. 4A-4D are process flow diagrams illustrating another embodiment method for generating a 3-D printable data mode for a 3-D design including a 3-D ad.
Figure 4B:
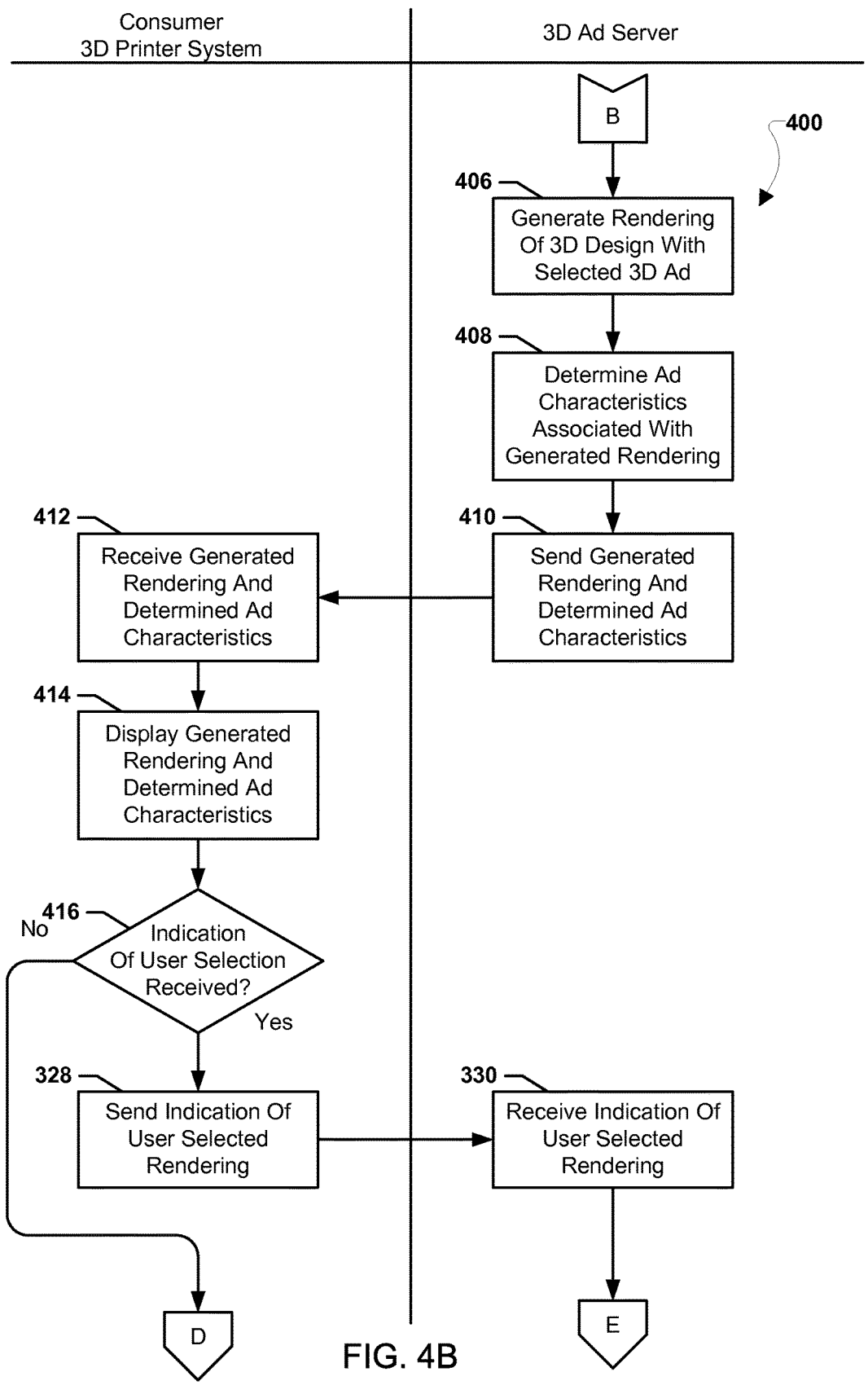

In response to determining that user approval is required (i.e., determination block 404="Yes"), the 3-D ad server may generate a rendering of the 3-D design with the selected 3-D ad in block 406 (FIG. 4B). In block 408 the 3-D ad server may determine the ad characteristics associated with the generated rendering. In block 410 the 3-D ad server may send the generated rendering and determined ad characteristics to the consumer 3-D printer system processor. In block 412 the consumer 3-D printer system processor may receive the generated rendering and determined ad characteristics. In block 414 the consumer 3-D printer system processor may display the generated rendering and determined ad characteristics. In this manner, the user may be able to visualize and approve or disapprove the selected ad.

In determination block 416 the consumer 3-D printer system processor may determine whether a user selection input is received. For example, the consumer 3-D printer system processor may determine whether the user has clicked on, selecting the generated rendering, or otherwise indicated that the selected 3-D ad is acceptable to print. In response to determining that an indication of a user selection is received (i.e., determination block 416="Yes"), in blocks 328-352 the 3-D ad server and the consumer 3-D printer system processor may perform operations of like numbered blocks of method 300 described above.

Figure 4C:
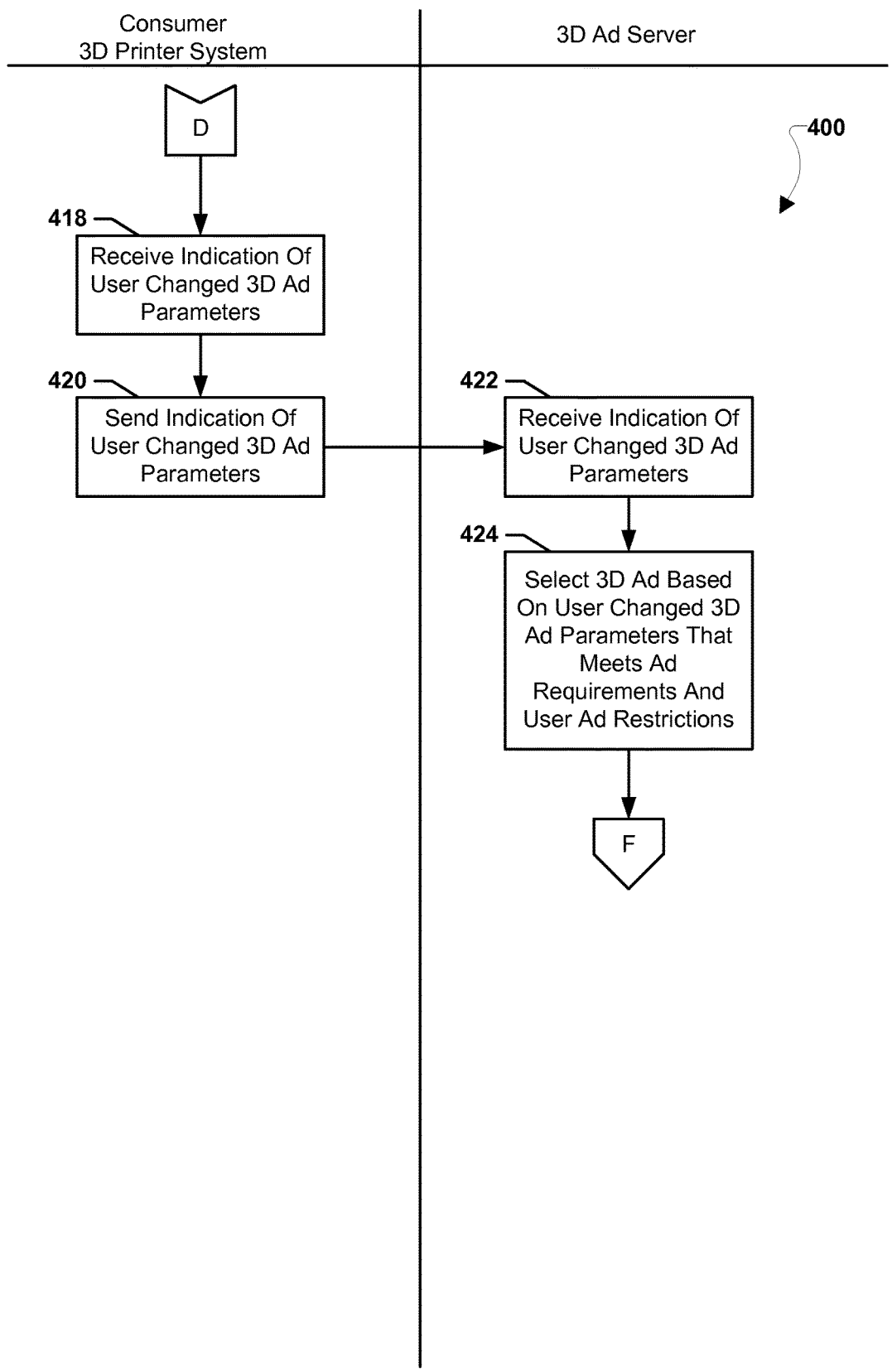
Figure 4D:
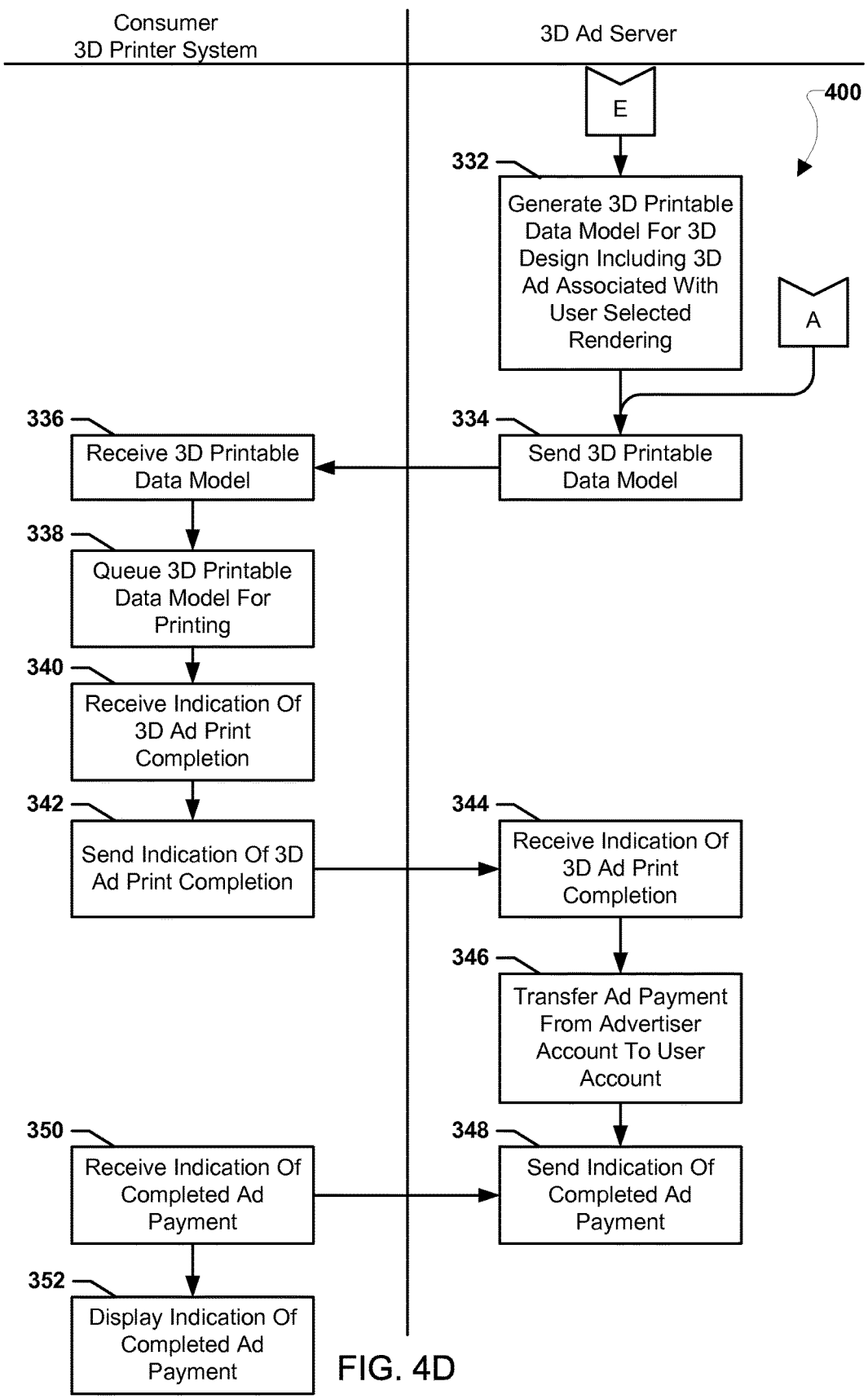

In response to determining that an indication of a user selection is not been received (i.e., determination block 416="No"), the consumer 3-D printer system processor may receive user inputs changing the 3-D ad parameters in block 418 (FIG. 4C). User changed 3-D ad parameters may be changes to the values or variables guiding ad selection previously set, for example by the metadata in the user account record. In this manner, users may adjust the default ad selection criteria when they are not satisfied with the current ad selection. In block 420 the consumer 3-D printer system processor may send the user changed 3-D ad parameters to the 3-D ad server, and the 3-D ad server may receive the indication of the user changed 3-D ad parameters in block 422. In block 424 the 3-D ad server may select a 3-D ad that meets the ad requirements and user ad restrictions as well as the user changed 3-D ad parameters. In this manner, a new 3-D ad may be selected for the user and the 3-D design based on the received user input. The ad server may again determine whether user approval is required in determination block 404 (FIG. 4A) and proceed as described above.

Figure 5B:
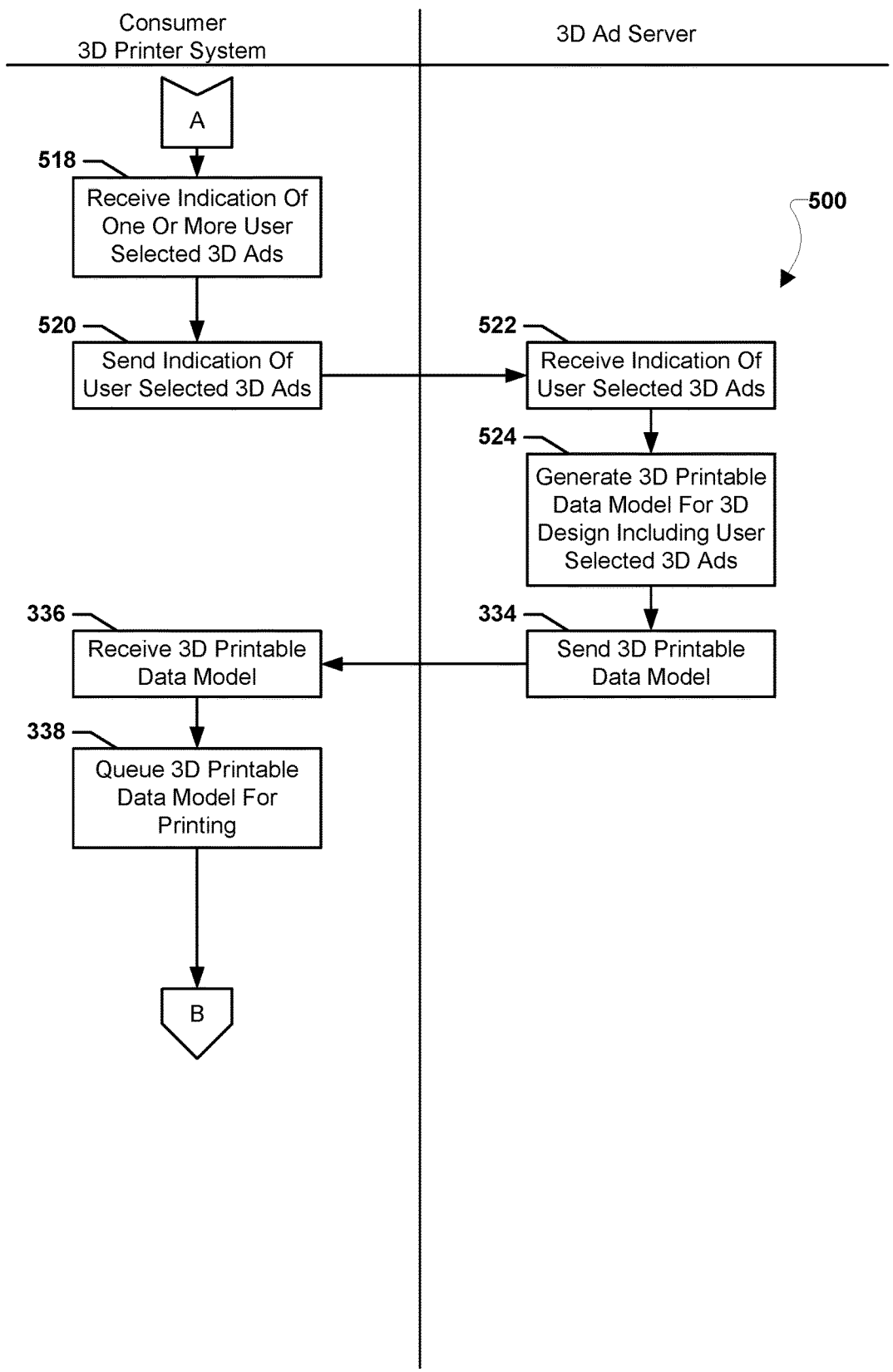
Figure 5C:
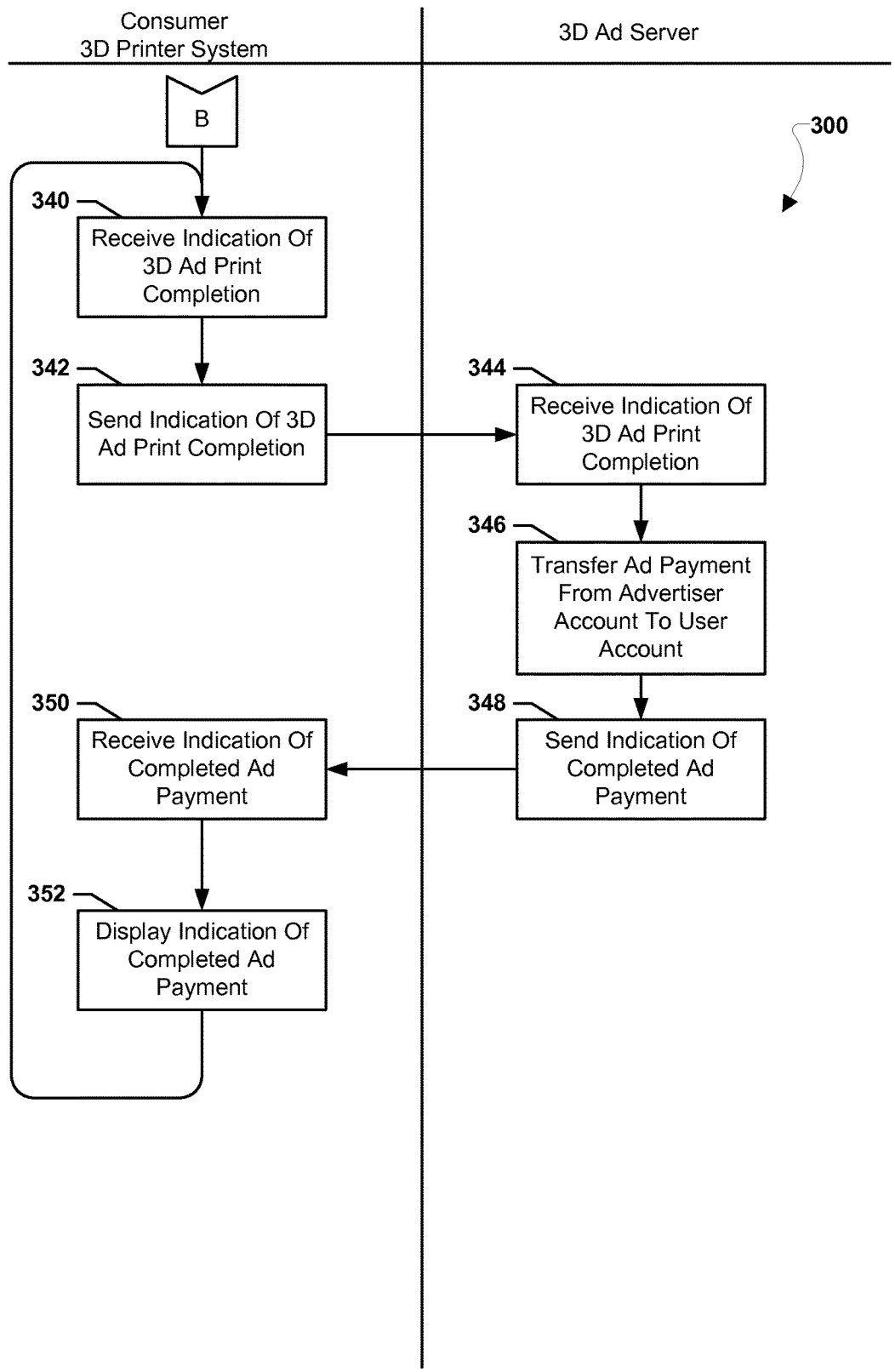

FIGS. 5A-5C illustrate an embodiment method 500 for user selection of 3-D ads for 3-D printing. In an embodiment, the operations of method 500 may be performed by a processor of a consumer 3-D printer system, such as a processor of a mobile computing device or a processor of a 3-D printer, in communication with a 3-D ad server. In an embodiment, the operations of method 500 may be performed in conjunction with method 200 described above with reference to FIG. 2.

As described above, in block 302 the consumer 3-D printer system processor may receive an indication of a 3-D design. In block 502 the consumer 3-D printer system processor may receive a user input selecting an ad area on the design to be printed. In this manner, the user may indicate the ad areas of the 3-D design that may be available for 3-D printing of ads. In block 504 the consumer 3-D printer system processor may send the indication of the 3-D design and user selected ad areas to the 3-D ad server, and the 3-D ad server may receive the indication of the 3-D design and user selected ad area in block 506.

In block 508 the 3-D ad server may determine ad requirements based on the 3-D design and the received user selected ad areas. For example, the ad requirements may include only a subset of the available ad areas, because the user did not indicate all possible ad areas for a 3-D design were available for 3-D ad printing. As described above in block 314, the 3-D ad server may select the possible 3-D ads that meet the ad requirements. In block 510 the 3-D ad server may determine ad characteristics associated with the selected 3-D ads. As an example, the 3-D ad server may determine ad payment amounts and advertiser credibility ratings associated with each 3-D ad. In block 512 the 3-D ad server may send the selected 3-D ads and the determined ad characteristics to the consumer 3-D printer system processor, and the consumer 3-D printer system processor may receive the selected 3-D ads and the determined ad characteristics in block 514. In block 516 the consumer 3-D printer system processor may display the selected 3-D ads and the determined ad characteristics.

In block 518 (FIG. 5B) the consumer 3-D printer system processor may receive user inputs indicating user selections of 3-D ads. In this manner, the user may indicate as few or as many ads as the user would like to have printed on the selected 3-D design. In block 520 the consumer 3-D printer system processor may send an indication of the user selected 3-D ads to the 3-D ad server, and the 3-D ad server may receive the indication of the user selected 3-D ads in block 522. In block 524 the 3-D ad server may generate a 3-D printable data model for the 3-D design including the user selected 3-D ads. In blocks 334-338 the 3-D ad server and consumer 3-D printer system processor may perform operations of like numbered blocks of method 300 described above. In blocks 340-352 (FIG. 5C) the consumer 3-D printer system processor and 3-D ad server may perform operations of like numbered blocks of method 300 described above. In an embodiment in which multiple 3-D ads are to be printed, the operations of blocks 340-352 may be performed repeatedly as each selected 3-D ad is printed.

Figure 6:
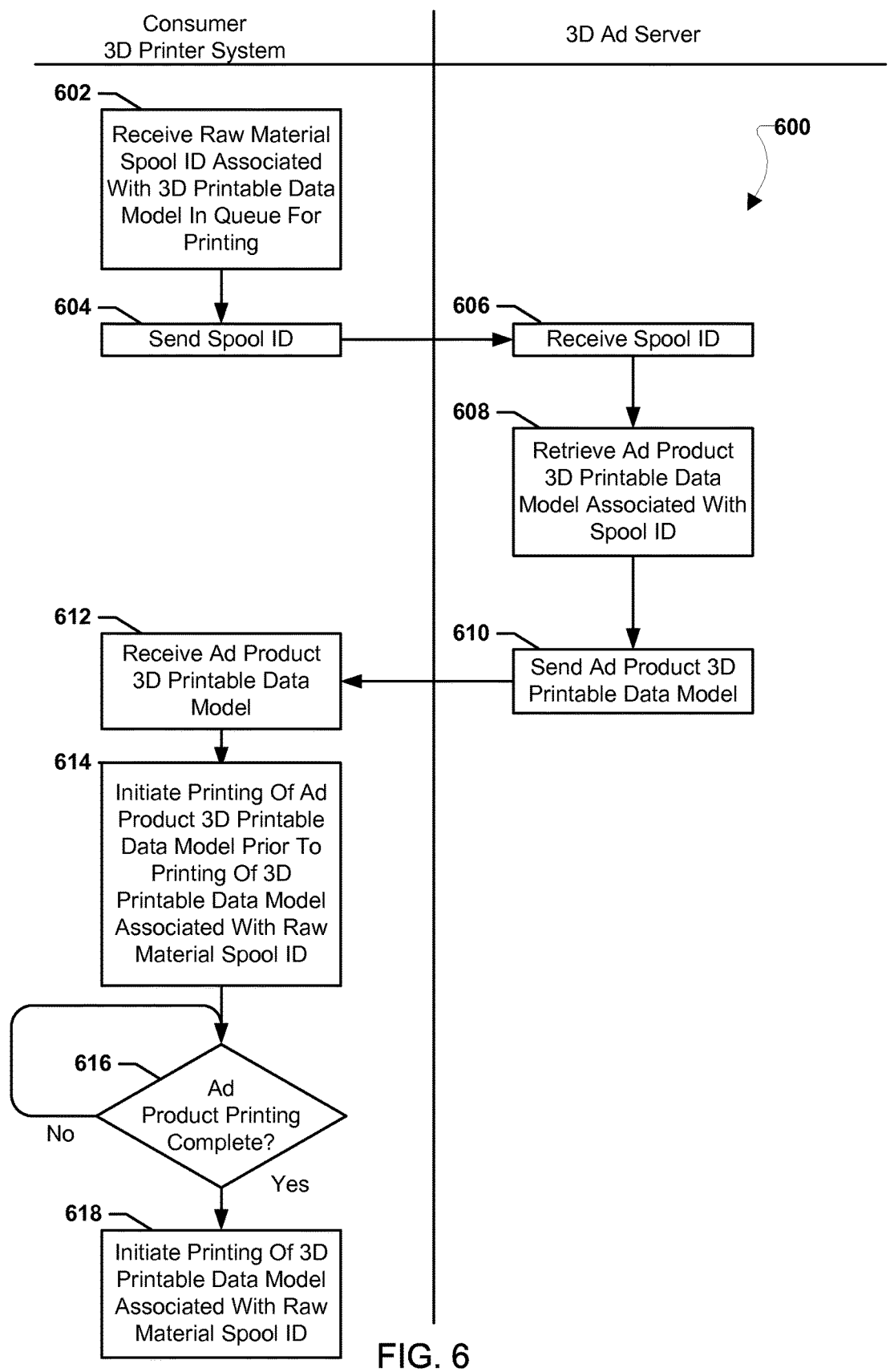
FIG. 6 is a process flow diagram illustrating an embodiment method for 3-D printer advertising.

FIG. 6 illustrates an embodiment method 600 for 3-D printer advertising. In an embodiment, the operations of method 600 may be performed by a processor of a consumer 3-D printer system, such as a processor of a mobile computing device or a processor of a 3-D printer, in communication with a 3-D ad server. In an embodiment, the operations of method 600 may be performed in conjunction with method 200 described above with reference to FIG. 2.

In block 602 the consumer 3-D printer system processor may receive a raw material spool identifier associated with a 3-D printable data model in the queue for printing. As an example, a raw material spool identifier may be a code assigned to a raw material kit for printing a product that is assigned by the vendor of the raw material kit. A sensor on a 3-D printer may read the raw material spool identifier and/or a user may enter the raw material spool identifier prior to printing a product. In block 604 the consumer 3-D printer system processor may send the spool identifier to the 3-D ad server and in block 606 the 3-D ad server may receive the spool identifier. In block 608 the 3-D ad server may retrieve an ad product 3-D printable data model associated with the spool ID. In an embodiment, an ad product 3-D printable data model associated with the spool ID may be a 3-D printable data model for a 3-D ad that a vendor previously received from an advertiser that purchased the right to use the additional raw material included in the raw material kit sold to the user. In block 610 the 3-D ad server may send the ad product 3-D printable data model to the consumer 3-D printer system processor and in block 612 the consumer 3-D printer system processor may receive the ad product 3-D printable data model.

In block 614 the consumer 3-D printer system processor may initiate printing of the ad product 3-D printable data model prior to printing of the 3-D printable data model associated with the raw material spool identifier. In determination block 616 the consumer 3-D printer system processor may determine whether ad product printing is complete. In this manner, the consumer 3-D printer system processor may ensure that the ad product is actually printed and printed before the 3-D rendering of the purchased product is complete. In response to determining that printing is not complete (i.e., determination block 616="No"), the consumer 3-D printer system processor may continue to monitor printing progress in block 616. In response to determining that printing is complete (i.e., determination block 616="Yes"), the consumer 3-D printer system processor may initiate printing of the 3-D printable data model associated with the raw material spool identifier in block 618.

Figure 7:
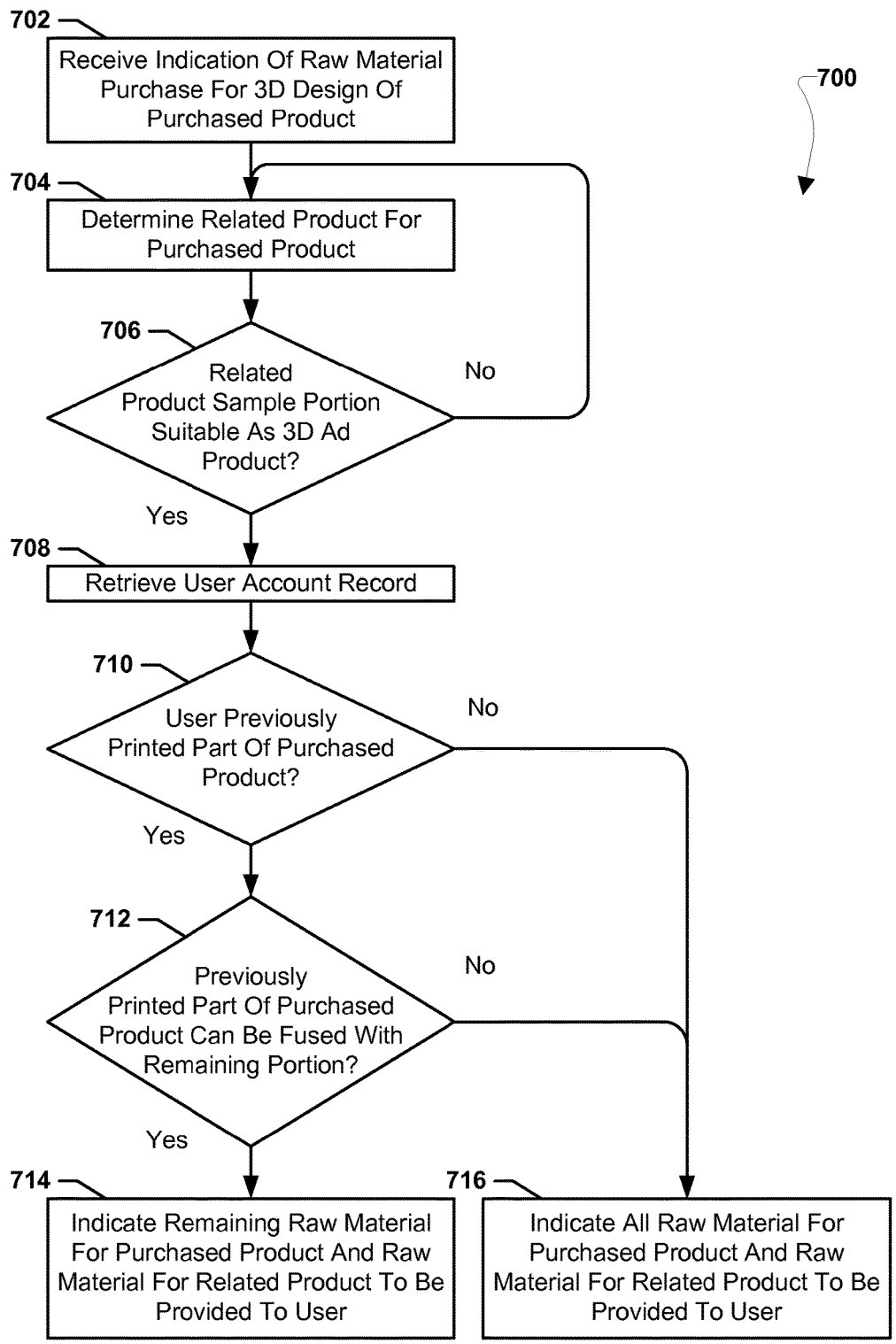
FIG. 7 is a process flow diagram illustrating an embodiment method for determining an amount of raw material to be provided to a user.

FIG. 7 illustrates an embodiment method 700 for determining an amount of raw material to be provided to a user. In an embodiment, the operations of method 700 may be performed by a 3-D ad server. In block 702 the 3-D ad server may receive an indication of a raw material purchase for a 3-D design of a purchased product. For example, the 3-D ad server may receive an indication from an on-line vendor (e.g., Amazon®) that a user has ordered an item that the user will 3-D print at home. In block 704 the 3-D ad server may determine a related product for the purchased product. For example, the user may have purchased a bike helmet and the 3-D ad server may determine a related product is a bike wheel. In determination block 706 the 3-D ad server may determine whether the related product sample portion (e.g., a cross section, frame, base, partial potion, etc.) is suitable for printing as a 3-D ad product. A product with a suitable sample portion (e.g., a cross section, frame, base, partial potion, etc.), may be a product for which printing a 3-D sample portion of the ultimate related product may give a user an appreciation for the look, feel, and/or operation of the ultimate related product. For example, a sample portion of a light bulb might not be suitable as a 3-D ad product because the user could not determine the illumination level of an unfinished bulb, but a corner of a picture frame might be a sample portion of a picture frame determined as a related product because the user could determine the shape and finish of the picture frame from the sample portion.

In response to determining that the related product is not suitable as a 3-D ad product (i.e., determination block 706="No"), the 3-D ad server may determine another related product for the purchased product in block 704. In response to determining that the related product is suitable (i.e., determination block 706="Yes"), the 3-D ad server may retrieve the user account record in block 708. As an example, the 3-D ad server may retrieve data from the user account record indicating the past print history of the user and the 3-D printing supply levels of the user's 3-D printer.

In determination block 710 the 3-D ad server may determine whether the user previously printed part of the purchased product. For example, the user may have purchased a product that was initially an ad product and the user may have a portion of the purchased product already printed. In such an example, the user may need less raw material to complete the object. In response to determining that the user did previously print part of the purchased product (i.e., determination block 710="Yes"), the 3-D ad server may determine whether the previously printed part of the purchased product can be fused with the remaining portion in determination block 712. In response to determining that the portions may be fused together (i.e., determination block 712="Yes"), the 3-D ad server may indicate the remaining raw material for the purchased product and raw material for the related product to be provided to the user in block 714. For example, the 3-D ad server may send a message to the vendor or user to provide the needed raw material for the ad product and less than the full amount of raw material needed to print the entire purchased product. Because less material may be required, the vendor may give the user a smaller amount of raw material. In response to determining that the user did not previously print part of the purchased object (i.e., determination block 710="No") or determining that the portions cannot be fused (i.e., determination block 712="No"), the 3-D ad server may indicate that all the raw material for the purchased product and raw material for the related product is to be provided to the user in block 716. For example, the 3-D ad server may send a message to the vendor to provide the needed raw material for the ad product and the full amount of raw material needed to print the entire purchased product.

Figure 8:
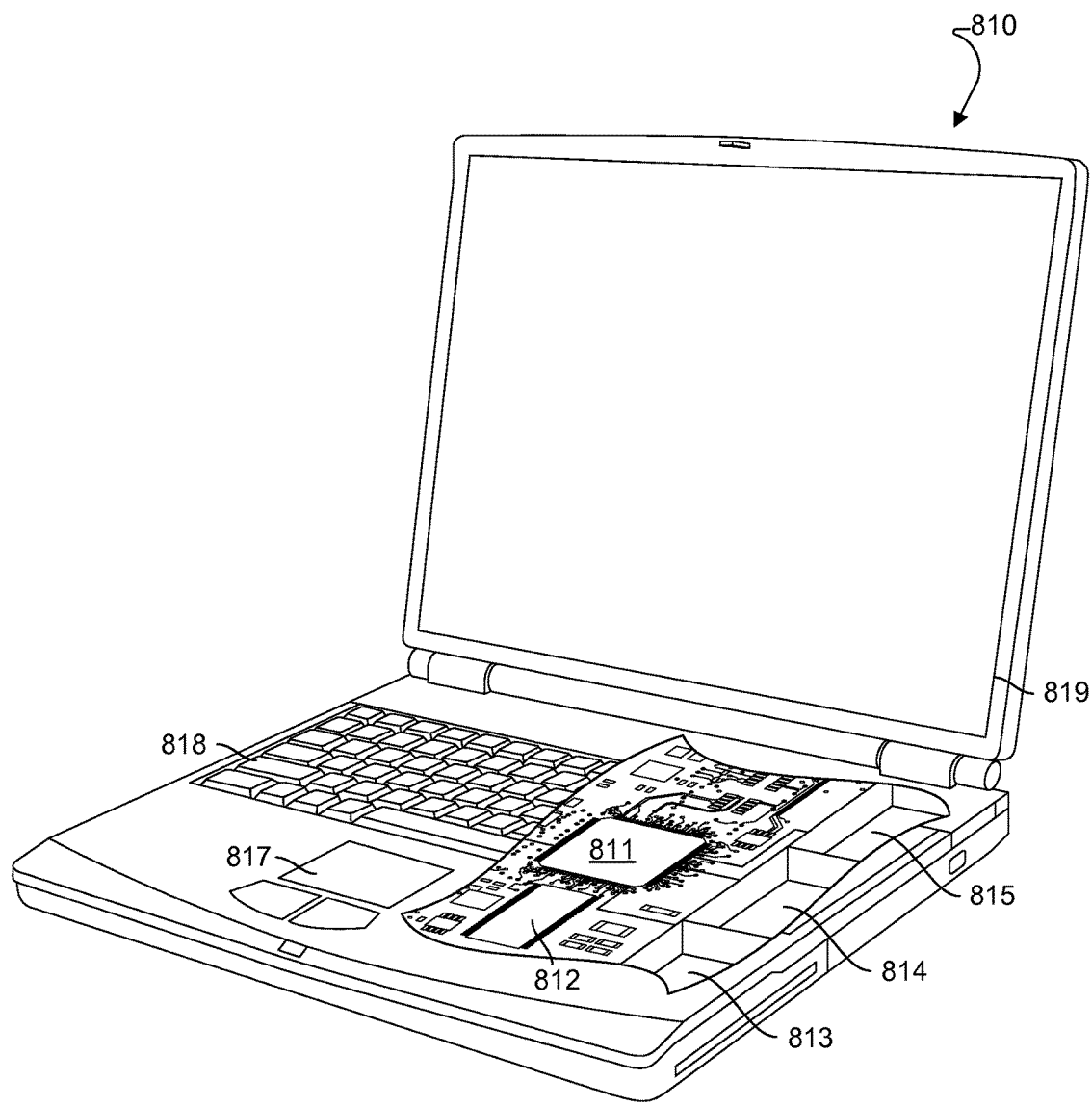
FIG. 8 is a component diagram of an example computing device suitable for use with the various embodiments.

The various embodiments described above may be implemented within a variety of user computing devices, such as a laptop computer 810 as illustrated in FIG. 8. Many laptop computers include a touch pad touch surface 817 that serves as the computer's pointing device, and thus may receive drag, scroll, and flick gestures similar to those implemented on mobile computing devices equipped with a touch screen display and described above. A laptop computer 810 will typically include a processor 811 coupled to volatile memory 712 and a large capacity nonvolatile memory, such as a disk drive 813 of Flash memory. The laptop computer 810 may also include a floppy disc drive 814 and a compact disc (CD) drive 815 coupled to the processor 811. The laptop computer 810 may also include a number of connector ports coupled to the processor 811 for establishing data connections or receiving external memory devices, such as a USB or FireWire® connector sockets, or other network connection circuits for coupling the processor 811 to a network, such as a local area network coupled to other computers and servers, the Internet, the public switched telephone network, and/or a cellular data network (e.g., CDMA, TDMA, GSM, PCS, 3G, 4G, LTE, or any other type of cellular data network). In a notebook configuration, the computer housing includes the touchpad 817, the keyboard 818, and the display 819 all coupled to the processor 811. Other configurations of the computing device may include a computer mouse or trackball coupled to the processor (e.g., via a USB input) as are well known, which may also be used in conjunction with the various embodiments.

Figure 9:
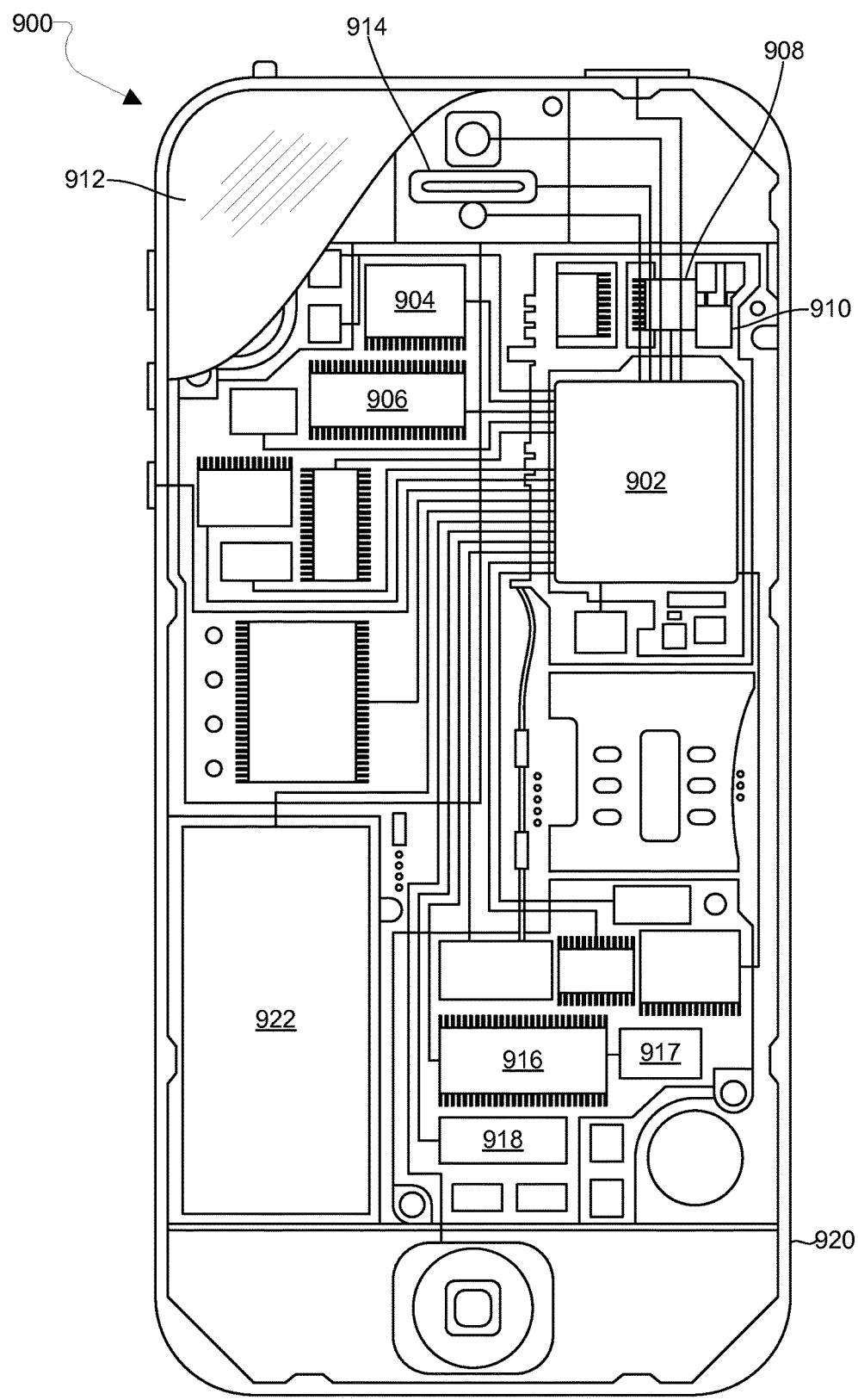
FIG. 9 is a component diagram of another example computing device suitable for use with the various embodiments.

The various embodiments may be implemented in any of a variety of computing devices, such as a mobile device, an example of which is illustrated in FIG. 9. For example, the mobile device 900 may include a processor 902 coupled to internal memories 904 and 906. Internal memories 904 and 906 may be volatile or non-volatile memories, and may also be secure and/or encrypted memories, or unsecure and/or unencrypted memories, or any combination thereof The processor 902 may also be coupled to a touch screen display 912, such as a resistive-sensing touch screen, capacitive-sensing touch screen infrared sensing touch screen, or the like. Additionally, the display of the mobile device 900 need not have touch screen capability.

The mobile device 900 may have one or more radio signal transceivers 908 (e.g., Peanut®, Bluetooth®, Zigbee®, Wi-Fi, RF radio) and antennae 910, for sending and receiving, coupled to each other and/or to the processor 902. The mobile device 900 may include a cellular network interface, such as wireless modem or modem chip 916 including a processor. The modem or modem chip 916 may enable communication via wide area network, such as a cellular data network (e.g., CDMA, TDMA, GSM, PCS, 3G, 4G, LTE, or any other type of cellular data network) and may be coupled to the processor 902. In an optional embodiment, the modem or modem chip 916 may be coupled to a component 917, including a processor and/or memory to support the modem or modem chip 916 in controlling access to content. The modem or modem chip 916 and component 917 may be completely separate pieces of hardware or may be hardware components on the same chip.

The mobile device 900 may include a peripheral device connection interface 918 coupled to the processor 902. The peripheral device connection interface 918 may be singularly configured to accept one type of connection, or multiply configured to accept various types of physical and communication connections, common or proprietary, such as USB, FireWire, Thunderbolt, or PCIe. The peripheral device connection interface 918 may also be coupled to a similarly configured peripheral device connection port. The mobile device 900 may also include speakers 914 for providing audio outputs. The mobile device 900 may also include a housing 920, constructed of a plastic, metal, or a combination of materials, for containing all or some of the components discussed herein. The mobile device 900 may include a power source 922 coupled to the processor 902, such as a disposable or rechargeable battery. The rechargeable battery may also be coupled to the peripheral device connection port to receive a charging current from a source external to the mobile device 900.

Figure 10:
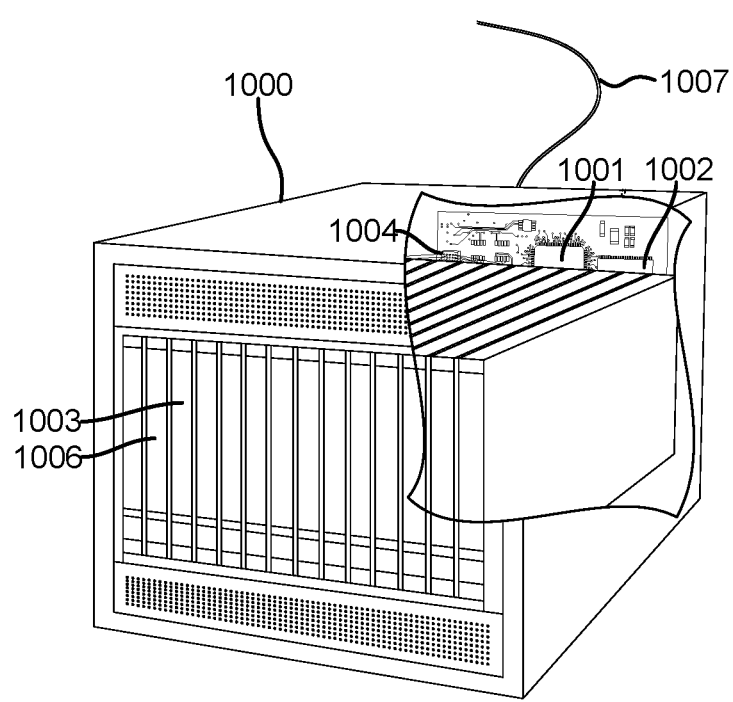
FIG. 10 is a component diagram of an example server suitable for use with the various embodiments.

The various embodiments may also be implemented on any of a variety of commercially available server devices, such as the server 1000 illustrated in FIG. 10. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1006 coupled to the processor 1001. The server 1000 may also include network access ports 1004 coupled to the processor 1001 for establishing network interface connections with a network 1007, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Figure 11:
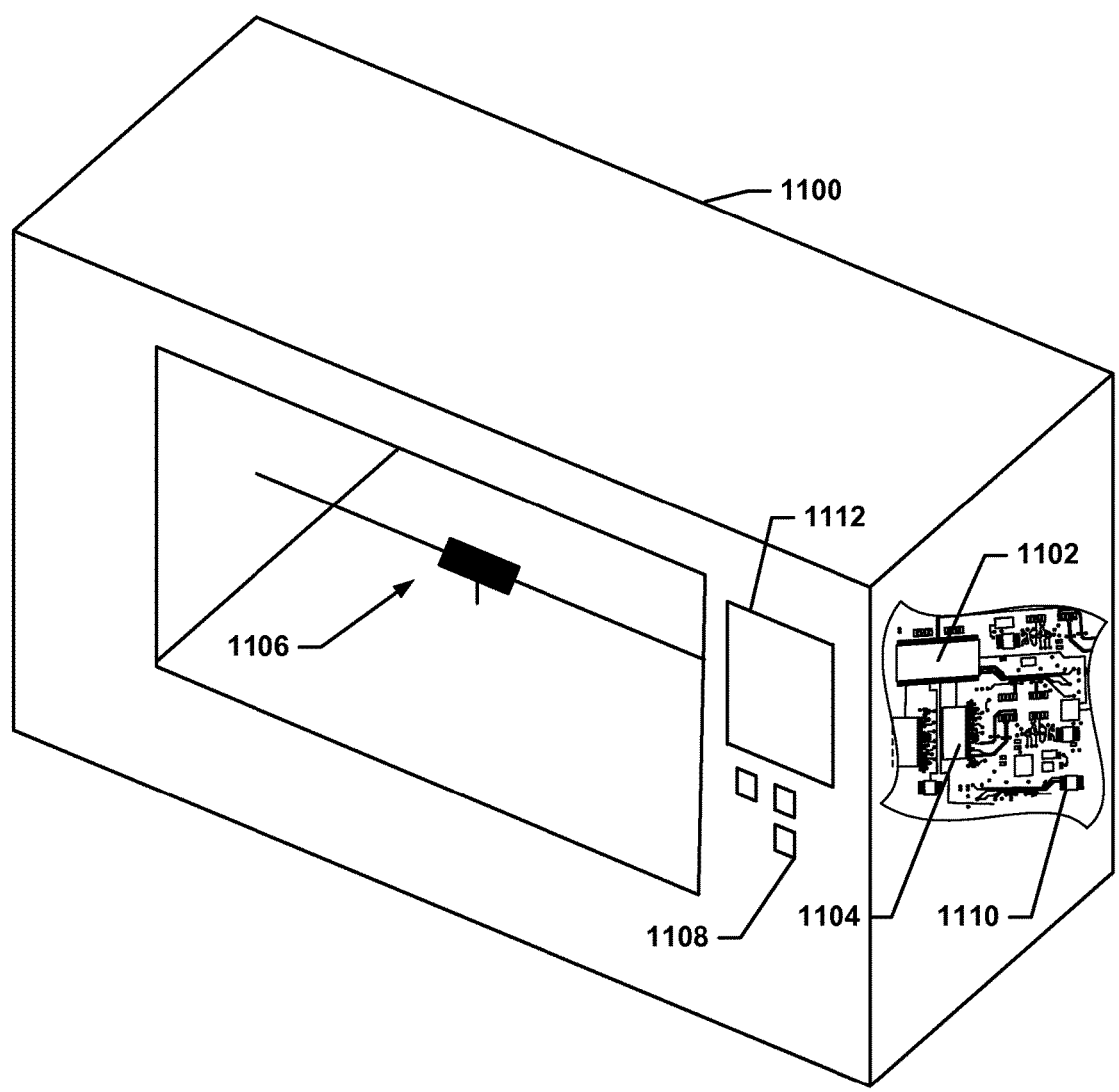
FIG. 11 is a component diagram of an example 3-D printer suitable for use with the various embodiments.

The various embodiments described above may also be implemented within a variety of 3-D printers, such as 3-D printer 1100 illustrated in FIG. 11. A 3-D printer 1100 may include a processor 1102 coupled to a memory 1104. The 3-D printer 1100 may include a print head 1106 that may be connected to the processor and configured to hold raw material cartridges and deposit raw material to 3-D print a product. The 3-D printer 1100 may also include a number of connector ports 1110 coupled to the processor 1102 for establishing data connections or receiving external memory devices, such as a USB or FireWire® connector sockets, or other network connection circuits for establishing network interface connections coupling the processor 1102 to a network, such as a local area network coupled to other computers and servers, the Internet, the public switched telephone network, and/or a cellular data network (e.g., CDMA, TDMA, GSM, PCS, 3G, 4G, LTE, or any other type of cellular data network). The 3-D printer 1100 may also include a touchpad 1108 and display 1112 all coupled to the processor 1102.

The processors 801, 902, 1001, and 1102 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in an internal memory before they are accessed and loaded into the processors 801, 902, 1001, and 1102. The processors 801, 902, 1001, and 1102 may include internal memory sufficient to store the application software instructions. In many devices the internal memory may be a volatile or nonvolatile memory, such as flash memory, or a mixture of both. For the purposes of this description, a general reference to memory refers to memory accessible by the processors 801, 902, 1001, and 1102 including internal memory or removable memory plugged into the computing device and memory within the processors 801, 902, 1001, and 1102 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof If implemented in software, the functions may be stored as one or more computer or processor executable instructions or code on a non-transitory computer-readable medium or non-transitory processor-readable medium. The steps of a method or algorithm disclosed herein may be embodied in a processor-executable software module which may reside on a non-transitory computer-readable medium or non-transitory processor readable medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for three-dimensional (3-D) printing, comprising:
  receiving, by a server, an indication of a 3-D design for a first 3-D printable product to be printed on a 3-D printer of a user;
  selecting, by the server, a 3-D ad for a second 3-D printable product to be printed on the 3-D printer in addition to the 3-D design for the first 3-D printable product, wherein the 3-D ad is a portion of the second 3-D printable product;
  generating, by the server, a 3-D printable data model for the 3-D design and the 3-D ad;
  sending, by the server, the 3-D printable data model to the 3-D printer;
  receiving, by the server, a request for raw material to print the second 3-D printable product;
  determining, by the server, whether the portion of the second 3-D printable product was previously printed on the 3-D printer of the user;
  determining, by the server, whether the portion of the second 3-D printable product is capable of being fused with a remaining portion of the second 3-D printable product in response to determining that the portion of the second 3-D printable product was previously printed; and
  sending, by the server, an indication that less than a full amount of the raw material for printing the remaining portion is needed to complete printing of the second 3-D printable product.

2. The method of claim 1, wherein selecting, at the server, a 3-D ad comprises:
  determining, at the server, ad requirements based on the 3-D design;
  determining, at the server, user ad restrictions based on information regarding the user and the user's 3-D printer; and
  selecting, at the server, a 3-D ad that meets the ad requirements and user ad restrictions.

3. The method of claim 2, wherein:
  information regarding the user and the user's 3-D printer include one or more of a user preference, a user printing history, a 3-D printer capability, and a 3-D printing supply level.

4. The method of claim 2, wherein the information regarding the user and the user's 3-D printer is stored in a database maintained in the server.

5. The method of claim 2, wherein the information regarding the user and the user's 3-D printer transmitted to the server by the 3-D printer of a user as metadata associated with the indication of the 3-D design to be printed on the 3-D printer.

6. The method of claim 1, further comprising:
  receiving, at the server, an indication of a 3-D ad print completion; and
  transferring from an advertiser account to a user account an ad payment for the 3-D ad in response to receiving the indication of the 3-D ad print completion.

7. The method of claim 1, wherein selecting, at the server, a 3-D ad comprises:
  determining, at the server, ad requirements based on the 3-D design;
  determining, at the server, user ad restrictions based on information regarding the user and the user's 3-D printer;
  selecting, at the server, possible 3-D ads that meet the ad requirements and user ad restrictions;
  generating, at the server, renderings of the 3-D design and all the selected 3-D ads;
  determining, at the server, ad characteristics associated with the generated renderings;
  sending, from the server to a 3-D printer system processor, the generated renderings and determined ad characteristics; and receiving, at the server, an indication of a user selected rendering of one of the generated renderings;

generating, at the server, a 3-D printable data model for the 3-D design and the 3-D ad comprises generating, at the server, a 3-D printable data model for the 3-D design and the 3-D ad associated with the user selected rendering.

8. The method of claim 7 wherein the ad characteristics are ad payment amounts and advertiser credibility ratings.

9. The method of claim 1, wherein the second 3-D printable product is related to the first 3-D printable product.

10. The method of claim 1, wherein the portion of the second 3-D printable product is a cross section of the second 3-D printable product.

11. The method of claim 1, wherein the 3-D printable data model is configured to print the 3-D ad before completing the printing of the 3-D design.

12. A server, comprising:
a network interface; and
a processor connected to the network interface, wherein the processor is configured with processor executable instructions to perform operations comprising:
receiving, via the network interface, an indication of a 3-D design for a first 3-D printable product to be printed on a 3-D printer of a user;
selecting a 3-D ad for a second 3-D printable product to be printed on the 3-D printer in addition to 3-D design for the first 3-D printable product, where the 3-D ad is a portion of the second 3-D printable product;
generating a 3-D printable data model for the 3-D design and the 3-D ad;
sending the 3-D printable data model to the 3-D printer via the network interface;
receiving a request for raw material to print the second 3-D printable product;
determining whether the portion of the second 3-D printable product was previously printed on the 3-D printer of the user;
determining whether the portion of the second 3-D printable product is capable of being fused with a remaining portion of the second 3-D printable product in response to determining that the portion of the second 3-D printable product was previously printed; and
sending an indication that less than a full amount of the raw material for printing the remaining portion is needed to complete printing of the second 3-D printable product.

13. The server of claim 12, wherein the processor is configured with processor executable instructions to perform operations such that selecting a 3-D ad comprises:
determining ad requirements based on the 3-D design;
determining user ad restrictions based on information regarding the user and the user's 3-D printer; and
selecting a 3-D ad that meets the ad requirements and user ad restrictions.

14. The server of claim 13, wherein:
information regarding the user and the user's 3-D printer include one or more of a user preference, a user printing history, a 3-D printer capability, and a 3-D printing supply level.

15. The server of claim 13, wherein the information regarding the user and the user's 3-D printer is stored in a database maintained in the server.

16. The server of claim 13, wherein the information regarding the user and the user's 3-D printer transmitted to the server by the 3-D printer of a user as metadata associated with the indication of the 3-D design to be printed on the 3-D printer.

17. The server of claim 12, wherein the processor is configured with processor executable instructions to perform operations further comprising:
receiving an indication of a 3-D ad print completion via the network interface; and
transferring from an advertiser account to a user account an ad payment for the 3-D ad in response to receiving the indication of the 3-D ad print completion.

18. The server of claim 12, wherein the processor is configured with processor executable instructions to perform operations such that selecting a 3-D ad comprises:
determining ad requirements based on the 3-D design;
determining user ad restrictions based on information regarding the user and the user's 3-D printer;
selecting possible 3-D ads that meet the ad requirements and user ad restrictions;
generating renderings of the 3-D design and all the selected 3-D ads;
determining ad characteristics associated with the generated renderings;
sending to a 3-D printer system processor via the network interface the generated renderings and determined ad characteristics;
receiving an indication of a user selected rendering of one of the generated renderings via the network interface; and
generating a 3-D printable data model for the 3-D design and the 3-D ad comprises generating, at the server, a 3-D printable data model for the 3-D design and the 3-D ad associated with the user selected rendering.

19. The server of claim 18, wherein the ad characteristics are ad payment amounts and advertiser credibility ratings.

20. The server of claim 12, the second 3-D printable product is related to the first 3-D printable product.

21. The server of claim 12, wherein the portion of the second 3-D printable product is a cross section of the second 3-D printable product.

22. The server of claim 12, wherein the 3-D printable data model is configured to print the 3-D ad before completing the printing of the 3-D design.

23. A server, comprising:
means for receiving an indication of a 3-D design for a first 3-D printable product to be printed on a 3-D printer of a user;
means for selecting a 3-D ad for a second 3-D printable product to be printed on the 3-D printer in addition to the 3-D design for the first 3-D printable product, wherein the 3-D ad is a portion of the second 3-D printable product;
means for generating a 3-D printable data model for the 3-D design and the 3-D ad;
means for sending the 3-D printable data model to the 3-D printer;
means for receiving a request for raw material to print the second 3-D printable product
means for determining whether the portion of the second 3-D printable product was previously printed on the 3-D printer of the user;
means for determining whether the portion of the second 3-D printable product is capable of being fused with a remaining portion of the second 3-D printable product in response to determining that the portion of the second 3-D printable product was previously printed; and means for sending an indication that less than a full amount of the raw material for printing the remaining portion is needed to complete printing of the second 3-D printable product.

24. The server of claim 23, wherein means for selecting a 3-D ad comprises:
   means for determining ad requirements based on the 3-D design;
   means for determining user ad restrictions based on information regarding the user and the user's 3-D printer; and
   means for selecting a 3-D ad that meets the ad requirements and user ad restrictions.

25. The server of claim 23, wherein means for selecting a 3-D ad comprises:
   means for determining ad requirements based on the 3-D design;
   means for determining user ad restrictions based on information regarding the user and the user's 3-D printer;
   means for selecting possible 3-D ads that meet the ad requirements and user ad restrictions;
   means for generating renderings of the 3-D design and all the selected 3-D ads;
   means for determining ad characteristics associated with the generated renderings;
   means for sending to a 3-D printer system processor the generated renderings and determined ad characteristics;
   means for receiving an indication of a user selected rendering of one of the generated renderings; and
   means for generating a 3-D printable data model for the 3-D design and the 3-D ad comprises generating, at the server, a 3-D printable data model for the 3-D design and the 3-D ad associated with the user selected rendering.

26. The server of claim 23, wherein the second 3-D printable product is related to the first 3-D printable product.

27. A non-transitory processor readable medium having stored thereon processor executable instructions configured to cause a processor to perform operations, comprising:
   receiving an indication of a 3-D design for a first 3-D printable product to be printed on a 3-D printer of a user;
   selecting a 3-D ad for a second 3-D printable product to be printed on the 3-D printer in addition to the 3-D design for the first 3-D printable product, wherein the 3-D ad is a portion of the second 3-D printable product;
   generating a 3-D printable data model for the 3-D design and the 3-D ad;
   sending the 3-D printable data model to the 3-D printer;
   receiving a request for raw material to print the second 3-D printable product;
   determining whether the portion of the second 3-D printable product was previously printed on the 3-D printer of the user;
   determining whether the portion of the second 3-D printable product is capable of being fused with a remaining portion of the second 3-D printable product in response to determining that the portion of the second 3-D printable product was previously printed; and
   sending an indication that less than a full amount of the raw material for printing the remaining portion is needed to complete printing of the second 3-D printable product.

28. The non-transitory processor readable medium of claim 27, wherein the stored processor executable instructions are configured to cause a processor to perform operations such that selecting a 3-D ad comprises:
   determining ad requirements based on the 3-D design;
   determining user ad restrictions based on information regarding the user and the user's 3-D printer; and
   selecting a 3-D ad that meets the ad requirements and user ad restrictions.

29. The non-transitory processor readable medium of claim 27, wherein the stored processor executable instructions are configured to cause a processor to perform operations such that selecting a 3-D ad comprises:
   determining ad requirements based on the 3-D design;
   determining user ad restrictions based on information regarding the user and the user's 3-D printer;
   selecting possible 3-D ads that meet the ad requirements and user ad restrictions;
   generating renderings of the 3-D design and all the selected 3-D ads;
   determining ad characteristics associated with the generated renderings;
   sending to a 3-D printer system processor the generated renderings and determined ad characteristics;
   receiving an indication of a user selected rendering of the generated renderings; and
   generating a 3-D printable data model for the 3-D design and the 3-D ad comprises generating, at a server, a 3-D printable data model for the 3-D design and the 3-D ad associated with the user selected rendering.

30. The non-transitory processor readable medium of claim 27, wherein the second 3-D printable product related to the first 3-D printable product.

* * * * *